US008828573B2

(12) United States Patent
Visco et al.

(10) Patent No.: US 8,828,573 B2
(45) Date of Patent: *Sep. 9, 2014

(54) ELECTRODE STRUCTURES FOR AQUEOUS ELECTROLYTE LITHIUM SULFUR BATTERIES

(75) Inventors: Steven J. Visco, Berkeley, CA (US); Yevgeniy S. Nimon, Danville, CA (US); Bruce D. Katz, Moraga, CA (US); Lutgard C. De Jonghe, Lafayette, CA (US); Nikolay Goncharenko, Walnut Creek, CA (US); Valentina Loginova, Walnut Creek, CA (US)

(73) Assignee: PolyPlus Battery Company, Berkeley, CA (US)

( * ) Notice: Subject to any disclaimer, the term of this patent is extended or adjusted under 35 U.S.C. 154(b) by 356 days.

This patent is subject to a terminal disclaimer.

(21) Appl. No.: 13/440,847

(22) Filed: Apr. 5, 2012

(65) Prior Publication Data

US 2013/0122344 A1 May 16, 2013

Related U.S. Application Data

(60) Provisional application No. 61/585,589, filed on Jan. 11, 2012, provisional application No. 61/560,134, filed on Nov. 15, 2011.

(51) Int. Cl.
*H01M 4/38* (2006.01)
*H01M 4/40* (2006.01)
*H01M 4/58* (2010.01)
*H01M 10/36* (2010.01)

(52) U.S. Cl.
CPC ............... *H01M 4/38* (2013.01); *H01M 4/405* (2013.01); *H01M 4/5815* (2013.01); *H01M 2200/20* (2013.01); *H01M 4/382* (2013.01); *Y02E 60/12* (2013.01); *H01M 10/36* (2013.01); *H01M 2200/10* (2013.01)
USPC .......................................................... 429/105

(58) Field of Classification Search
CPC ..... H01M 8/136; H01M 8/1397; H01M 8/188; H01M 8/20; H01M 4/5815; H01M 4/58
See application file for complete search history.

(56) References Cited

U.S. PATENT DOCUMENTS 3,528,856 A 9/1970 Ovshinsky
3,607,417 A 9/1971 McRae et al.

(Continued)

FOREIGN PATENT DOCUMENTS

EP 0111213 11/1983
EP 0111214 11/1983

(Continued)

OTHER PUBLICATIONS

International Search Report and Written Opinion dated Oct. 18, 2005 from International Application No. PCT/US2004/033372.

(Continued)

*Primary Examiner* — Ula C Ruddock
*Assistant Examiner* — Scott J Chmielecki
(74) *Attorney, Agent, or Firm* — Weaver Austin Villeneuve & Sampson LLP

(57) ABSTRACT

Provided are lithium sulfur battery cells that use water as an electrolyte solvent. In various embodiments the water solvent enhances one or more of the following cell attributes: energy density, power density and cycle life. Significant cost reduction can also be realized by using an aqueous electrolyte in combination with a sulfur cathode. For instance, in applications where cost per Watt-Hour (Wh) is paramount, such as grid storage and traction applications, the use of an aqueous electrolyte in combination with inexpensive sulfur as the cathode active material can be a key enabler for the utility and automotive industries, providing a cost effective and compact solution for load leveling, electric vehicles and renewable energy storage.

20 Claims, 7 Drawing Sheets

(56) References Cited

U.S. PATENT DOCUMENTS

| | | | |
|---|---|---|---|
| 3,615,835 A | 10/1971 | Ovshinsky | |
| 3,625,769 A | 12/1971 | Lyall | |
| 3,703,415 A | 11/1972 | Mitoff et al. | |
| 3,912,536 A | 10/1975 | Galli et al. | |
| 3,976,509 A | 8/1976 | Tsai et al. | |
| 4,007,057 A | 2/1977 | Littauer et al. | |
| 4,091,182 A | 5/1978 | Farrington et al. | |
| 4,162,202 A | 7/1979 | Dey | |
| 4,163,084 A | 7/1979 | Tsai et al. | |
| 4,210,707 A | 7/1980 | Farrington | |
| 4,402,995 A | 9/1983 | Fleischer | |
| 4,405,416 A | 9/1983 | Raistrick et al. | |
| 4,414,293 A | 11/1983 | Joy et al. | |
| 4,504,561 A | 3/1985 | Winsel | |
| 4,828,942 A | 5/1989 | Licht | |
| 4,833,048 A | 5/1989 | De Jonghe et al. | |
| 4,916,036 A | 4/1990 | Cheiky | |
| 4,917,974 A | 4/1990 | Visco et al. | |
| 4,981,672 A | 1/1991 | De Neufville et al. | |
| 4,985,317 A | 1/1991 | Adachi et al. | |
| 5,035,963 A | 7/1991 | Plichta | |
| 5,100,523 A | 3/1992 | Helms et al. | |
| 5,108,856 A | 4/1992 | Shuster | |
| 5,162,175 A | 11/1992 | De Jonghe et al. | |
| 5,166,011 A | 11/1992 | Rao et al. | |
| 5,198,081 A | 3/1993 | Kanoh et al. | |
| 5,213,908 A | 5/1993 | Hagedorn | |
| 5,314,765 A | 5/1994 | Bates | |
| 5,336,384 A | 8/1994 | Tsou et al. | |
| 5,338,625 A | 8/1994 | Bates et al. | |
| 5,342,710 A | 8/1994 | Koksbang | |
| 5,387,479 A | 2/1995 | Koksbang | |
| 5,409,786 A | 4/1995 | Bailey | |
| 5,413,881 A * | 5/1995 | Licht et al. | 429/105 |
| 5,427,873 A | 6/1995 | Shuster | |
| 5,455,126 A | 10/1995 | Bates et al. | |
| 5,506,068 A | 4/1996 | Dan et al. | |
| 5,510,209 A | 4/1996 | Abraham et al. | |
| 5,512,147 A | 4/1996 | Bates et al. | |
| 5,516,598 A | 5/1996 | Chu et al. | |
| 5,523,179 A | 6/1996 | Chu | |
| 5,525,442 A | 6/1996 | Shuster | |
| 5,532,077 A | 7/1996 | Chu | |
| 5,567,210 A | 10/1996 | Bates et al. | |
| 5,569,520 A | 10/1996 | Bates | |
| 5,571,600 A | 11/1996 | Licht | |
| 5,582,623 A | 12/1996 | Chu | |
| 5,597,660 A | 1/1997 | Bates et al. | |
| 5,612,152 A | 3/1997 | Bates | |
| 5,648,183 A | 7/1997 | Licht et al. | |
| 5,648,187 A | 7/1997 | Skotheim | |
| 5,652,068 A | 7/1997 | Shuster et al. | |
| 5,665,481 A | 9/1997 | Shuster et al. | |
| 5,686,201 A | 11/1997 | Chu | |
| 5,696,201 A | 12/1997 | Cavalloni et al. | |
| 5,702,995 A | 12/1997 | Fu | |
| 5,789,108 A | 8/1998 | Chu | |
| 5,814,420 A | 9/1998 | Chu | |
| 5,882,812 A | 3/1999 | De Jonghe et al. | |
| 5,961,672 A | 10/1999 | Skotheim et al. | |
| 5,962,171 A | 10/1999 | Boguslavsky et al. | |
| 6,017,651 A | 1/2000 | Chu et al. | |
| 6,025,094 A | 2/2000 | Visco et al. | |
| 6,025,095 A | 2/2000 | Kawamura | |
| 6,030,720 A | 2/2000 | Chu et al. | |
| 6,030,909 A | 2/2000 | Fu | |
| 6,066,417 A | 5/2000 | Cho et al. | |
| 6,068,950 A | 5/2000 | Gan et al. | |
| 6,096,447 A | 8/2000 | Gan et al. | |
| 6,110,236 A | 8/2000 | Chu et al. | |
| 6,146,787 A | 11/2000 | Harrup et al. | |
| 6,165,644 A | 12/2000 | Chu et al. | |
| 6,183,901 B1 | 2/2001 | Ying et al. | |
| 6,198,701 B1 | 3/2001 | De Jonghe et al. | |
| 6,200,701 B1 | 3/2001 | Gan et al. | |
| 6,200,704 B1 | 3/2001 | De Jonghe et al. | |
| 6,203,942 B1 | 3/2001 | Gan et al. | |
| 6,203,947 B1 | 3/2001 | Peled et al. | |
| 6,207,324 B1 | 3/2001 | Licht | |
| 6,210,832 B1 | 4/2001 | Chu et al. | |
| 6,214,061 B1 | 4/2001 | Visco et al. | |
| 6,225,002 B1 | 5/2001 | Chu et al. | |
| 6,228,527 B1 | 5/2001 | Medeiros et al. | |
| 6,248,481 B1 | 6/2001 | De Jonghe et al. | |
| 6,274,269 B1 | 8/2001 | Gan et al. | |
| 6,280,598 B1 | 8/2001 | Barton et al. | |
| 6,296,958 B1 | 10/2001 | Pinto et al. | |
| 6,315,881 B1 | 11/2001 | Fu | |
| 6,344,293 B1 | 2/2002 | Geronov | |
| 6,358,643 B1 | 3/2002 | Katz et al. | |
| 6,358,651 B1 | 3/2002 | Chen et al. | |
| 6,376,123 B1 | 4/2002 | Chu | |
| 6,391,492 B1 | 5/2002 | Kawakami et al. | |
| 6,402,795 B1 | 6/2002 | Chu et al. | |
| 6,413,284 B1 | 7/2002 | Chu et al. | |
| 6,413,285 B1 | 7/2002 | De Jonghe et al. | |
| 6,432,584 B1 | 8/2002 | Visco et al. | |
| 6,475,677 B1 | 11/2002 | Inda et al. | |
| 6,485,622 B1 | 11/2002 | Fu | |
| 6,489,055 B1 | 12/2002 | Ichihashi et al. | |
| 6,495,285 B2 | 12/2002 | Gan et al. | |
| 6,511,772 B2 | 1/2003 | Gan et al. | |
| 6,537,698 B2 | 3/2003 | Gan et al. | |
| 6,537,701 B1 | 3/2003 | Chu et al. | |
| 6,632,573 B1 | 10/2003 | Nimon et al. | |
| 6,723,140 B2 | 4/2004 | Chu et al. | |
| 6,733,924 B1 | 5/2004 | Skotheim et al. | |
| 6,737,197 B2 | 5/2004 | Chu et al. | |
| 6,766,817 B2 | 7/2004 | Da Silva | |
| 6,770,187 B1 | 8/2004 | Putter et al. | |
| 6,797,428 B1 | 9/2004 | Skotheim et al. | |
| 6,835,492 B2 | 12/2004 | Cho et al. | |
| 6,911,280 B1 | 6/2005 | De Jonghe et al. | |
| 6,955,866 B2 | 10/2005 | Nimon et al. | |
| 6,991,662 B2 | 1/2006 | Visco et al. | |
| 7,070,632 B1 | 7/2006 | Visco et al. | |
| 7,211,351 B2 | 5/2007 | Klaassen | |
| 7,211,532 B2 | 5/2007 | Fu | |
| 7,247,408 B2 | 7/2007 | Skotheim | |
| 7,282,295 B2 | 10/2007 | Visco et al. | |
| 7,282,296 B2 | 10/2007 | Visco et al. | |
| 7,282,302 B2 | 10/2007 | Visco et al. | |
| 7,344,804 B2 | 3/2008 | Klaassen | |
| 7,390,591 B2 | 6/2008 | Visco et al. | |
| 7,432,017 B2 | 10/2008 | Visco et al. | |
| 7,491,458 B2 | 2/2009 | Visco et al. | |
| 7,608,178 B2 | 10/2009 | De Jonghe et al. | |
| 7,645,543 B2 | 1/2010 | Visco et al. | |
| 7,666,233 B2 | 2/2010 | Visco et al. | |
| 7,771,870 B2 | 8/2010 | Affinito et al. | |
| 7,781,108 B2 | 8/2010 | Visco et al. | |
| 7,829,212 B2 | 11/2010 | Visco et al. | |
| 7,838,144 B2 | 11/2010 | Visco et al. | |
| 7,858,223 B2 | 12/2010 | Visco et al. | |
| 7,998,626 B2 | 8/2011 | Visco et al. | |
| 8,048,571 B2 | 11/2011 | Visco et al. | |
| 8,114,171 B2 | 2/2012 | Visco et al. | |
| 8,182,943 B2 | 5/2012 | Visco et al. | |
| 8,202,649 B2 | 6/2012 | Visco et al. | |
| 8,334,075 B2 | 12/2012 | Visco et al. | |
| 2001/0014420 A1 | 8/2001 | Takeuchi et al. | |
| 2001/0028977 A1 | 10/2001 | Kazacos et al. | |
| 2001/0041294 A1 | 11/2001 | Chu et al. | |
| 2002/0012845 A1 | 1/2002 | Choi et al. | |
| 2002/0012846 A1 | 1/2002 | Skotheim et al. | |
| 2002/0034688 A1 | 3/2002 | Chu et al. | |
| 2002/0068220 A1 | 6/2002 | Wyler | |
| 2002/0102465 A1 | 8/2002 | Chen et al. | |
| 2002/0106563 A1 | 8/2002 | Okawa | |
| 2003/0124433 A1 | 7/2003 | Kim et al. | |
| 2003/0190501 A1 | 10/2003 | Rendina | |
| 2003/0224234 A1 | 12/2003 | Steele et al. | |
| 2004/0081894 A1 | 4/2004 | Nimon et al. | |
| 2004/0126653 A1 | 7/2004 | Visco et al. | |

(56) References Cited

U.S. PATENT DOCUMENTS

| | | | |
|---|---|---|---|
| 2004/0142244 A1 | 7/2004 | Visco et al. | |
| 2004/0185334 A1 | 9/2004 | Iwamoto | |
| 2004/0191617 A1 | 9/2004 | Visco et al. | |
| 2004/0197641 A1 | 10/2004 | Visco et al. | |
| 2005/0095506 A1 | 5/2005 | Klaassen | |
| 2005/0100792 A1 | 5/2005 | Visco et al. | |
| 2005/0100793 A1 | 5/2005 | De Jonghe et al. | |
| 2005/0158614 A1 | 7/2005 | Hennessy | |
| 2005/0158615 A1 | 7/2005 | Samuel et al. | |
| 2005/0175894 A1 | 8/2005 | Visco et al. | |
| 2005/0186469 A1 | 8/2005 | De Jonghe et al. | |
| 2005/0208353 A1 | 9/2005 | Johnson | |
| 2006/0046149 A1 | 3/2006 | Yong et al. | |
| 2006/0063051 A1 | 3/2006 | Jang | |
| 2006/0078790 A1 | 4/2006 | Nimon et al. | |
| 2006/0183011 A1 | 8/2006 | Mittelsteadt et al. | |
| 2006/0208701 A1 | 9/2006 | Mikhaylik | |
| 2007/0087269 A1 | 4/2007 | Inda | |
| 2007/0117007 A1 | 5/2007 | Visco et al. | |
| 2007/0117026 A1 | 5/2007 | Kumar et al. | |
| 2007/0172739 A1* | 7/2007 | Visco et al. | 429/322 |
| 2007/0231704 A1 | 10/2007 | Inda | |
| 2008/0038641 A1 | 2/2008 | Visco et al. | |
| 2008/0052898 A1 | 3/2008 | Visco et al. | |
| 2008/0057386 A1 | 3/2008 | Visco et al. | |
| 2008/0057387 A1 | 3/2008 | Visco et al. | |
| 2008/0057399 A1 | 3/2008 | Visco et al. | |
| 2009/0286114 A1 | 11/2009 | Visco et al. | |
| 2009/0297935 A1 | 12/2009 | Visco et al. | |
| 2010/0104934 A1 | 4/2010 | Visco et al. | |
| 2011/0014522 A1 | 1/2011 | Visco et al. | |
| 2011/0039144 A1 | 2/2011 | Visco et al. | |
| 2011/0269031 A1 | 11/2011 | Visco et al. | |
| 2012/0009469 A1 | 1/2012 | Visco et al. | |
| 2012/0094188 A1 | 4/2012 | Visco et al. | |
| 2013/0059177 A1 | 3/2013 | De Jonghe et al. | |
| 2013/0122334 A1 | 5/2013 | Visco et al. | |
| 2013/0141050 A1 | 6/2013 | Visco et al. | |

FOREIGN PATENT DOCUMENTS

| | | |
|---|---|---|
| EP | 0694501 | 1/1996 |
| EP | 0838441 | 4/1998 |
| EP | 0875951 | 11/1998 |
| EP | 0689260 | 4/1999 |
| EP | 1162675 | 12/2001 |
| EP | 1892780 | 2/2008 |
| JP | 55-081471 | 6/1980 |
| JP | 57-003371 | 1/1982 |
| JP | 57-017568 | 1/1982 |
| JP | 62-243247 | 10/1987 |
| JP | 63-198261 | 8/1988 |
| JP | 09-320645 | 12/1997 |
| JP | 2001-351615 | 12/2001 |
| JP | 2002-513991 | 5/2002 |
| JP | 2002-518796 | 6/2002 |
| WO | 98/28811 | 7/1998 |
| WO | 99/57770 | 11/1999 |
| WO | 00/51198 | 8/2000 |
| WO | 01/33651 | 5/2001 |
| WO | 01/39302 | 5/2001 |
| WO | 02/50933 | 6/2002 |
| WO | 02/095849 | 11/2002 |
| WO | 2004/036669 | 4/2004 |
| WO | 2005/038953 | 4/2005 |
| WO | 2005/038962 | 4/2005 |

OTHER PUBLICATIONS

U.S. Appl. No. 11/092,781, Office Action mailed Jun. 16, 2006.
U.S. Appl. No. 11/092,781, Office Action mailed Feb. 1, 2007.
U.S. Appl. No. 11/092,781, Office Action mailed Jun. 25, 2007.
U.S. Appl. No. 11/092,781, Office Action mailed Feb. 22, 2008.
U.S. Appl. No. 10/686,189, Office Action mailed Oct. 12, 2006.
U.S. Appl. No. 10/686,189, Office Action mailed Apr. 11, 2007.
U.S. Appl. No. 10/731,771, Office Action mailed Sep. 28, 2006.
U.S. Appl. No. 10/731,771, Office Action mailed Mar. 16, 2007.
U.S. Appl. No. 10/772,157, Office Action mailed Nov. 1, 2007.
U.S. Appl. No. 10/772,157, Office Action mailed Feb. 6, 2008.
U.S. Appl. No. 10/772,157, Office Action mailed Jul. 11, 2008.
U.S. Appl. No. 10/772,157, Office Action mailed Dec. 30, 2008.
U.S. Appl. No. 11/824,548, Office Action mailed Mar. 20, 2008.
U.S. Appl. No. 11/824,548, Office Action mailed Jan. 26, 2009.
U.S. Appl. No. 10/825,587, Office Action mailed Jun. 25, 2007.
U.S. Appl. No. 10/825,587, Office Action mailed Apr. 1, 2008.
U.S. Appl. No. 10/825,587, Office Action mailed Jun. 5, 2008.
U.S. Appl. No. 10/825,587, Office Action mailed Oct. 16, 2008.
U.S. Appl. No. 10/772,228, Office Action mailed Sep. 21, 2007.
U.S. Appl. No. 10/772,228, Office Action mailed Nov. 28, 2006.
U.S. Appl. No. 10/824,944, Office Action mailed Mar. 12, 2007.
U.S. Appl. No. 10/824,944, Office Action mailed Sep. 7, 2006.
U.S. Appl. No. 11/245,472, Office Action mailed Aug. 23, 2007.
U.S. Appl. No. 11/245,472, Office Action mailed Apr. 16, 2008.
U.S. Appl. No. 10/986,441, Office Action mailed Oct. 20, 2008.
U.S. Appl. No. 11/823,847, Office Action mailed Sep. 16, 2008.
U.S. Appl. No. 12/649,245, Office Action mailed Mar. 31, 2010.
U.S. Appl. No. 10/825,587, Notice of Allowance mailed Nov. 24, 2008.
U.S. Appl. No. 10/772,228, Notice of Allowance mailed Jan. 22, 2008.
U.S. Appl. No. 11/824,574, Office Action mailed Dec. 31, 2008.
China patent application No. 2003801061464, First Office Action mailed Oct. 27, 2006.
Nippon Telegr & Teleph Corp., "Patent Abstracts of Japan," vol. 008, No. 119 (E248), Jun. 5, 1984 & JP 59 031573 A, Feb. 20, 1984.
Anders et al., "Plasma is Produced Simply", R&D Research & Development, R&D Magazine, vol. 39, No. 10, Sep. 1997, www.rdmag.com, p. 65.
Steven D. Jones, et al., "Thin film rechargeable Li batteries", 1994, *Solid State Ionics*.
J.B. Bates, et al., "Thin-film rechargeable lithium batteries," 1995, *Journal of Power Sources*.
N. J. Dudney, et al., "Sputtering of lithium compounds for preparation of electrolyte thin films," 1992, *Solid State Ionics*.
J. B. Bates, et al., "Electrical properties of amorphous lithium electrolye thin films," 1992, *Solid State Ionics*.
Xiaohua Yu, et al, "A Stable Thin-Film Lithium Electrolyte: Lithium Phosphorus Oxynitride," Feb. 1997, *J. Electrochem. Soc.*, vol. 144, No. 2.
Fu, Jie, "Fast Li+ Ion Conduction in Li2O-Al2O3-TiO2-SiO2-P2O5 Glass-Ceramics", Journal of the American Ceramics Society, vol. 80, No. 7, Jul. 1997, pp. 1-5.
Aono et al., "Ionic Conductivity of the Lithium Titanium Phosphate $(Li_{1+x}M_xTi_{2-x}(PO_4)_3$, M = Al, Sc, Y, and La) Systems", Dept. of Industrial Chemistry, pp. 590-591, Aug. 19, 1988.
Aono, Hiromichi, "High Li+ Conducting Ceramics", Acc. Chem. Res. vol. 27, No. 9, 1994, pp. 265-270.
Aono, et al., "Ionic Conductivity and Sinterability of Lithium Titanium Phosphate System", Solid State Ionics, 40/41 (1990), pp. 38-42.
Aono, et al., "Electrical properties and crystal structure of solid electrolyte based on lithium hafnium phosphate $LiHf_2(PO_4)_3$", Solid State Ionics 62 (1993), pp. 309-316.
Aono, et al., "Electrical property and sinterability of $LiTi_2(PO_4)_3$ mixed with lithium salt ($Li_3PO_4$ or $Li_3BO_3$)", Solid State Ionics 47 (1991) pp. 257-264.
Aono, et al., "Ionic Conductivity of $\beta$=$Fe_2(SO_4)_3$ Type $Li_3Cr_2(PO_4)_3$ Based Electrolyte", Chemistry Letters, 1993, pp. 2033-2036.
Aono, et al., "Ionic Conductivity of $LiTi_2(PO_4)_3$ Mixed with Lithium Salts", Chemistry Letters, 1990, pp. 331-334.
Fu, Jie, "Superionic conductivity of glass-ceramics in the system $Li_2O-Al_2O_3-TiO_3-P_2O_5$", Solid State Ionics, 96 (1997), pp. 195-200.
Fu, Jie, "Fast Li+ ion conducting glass-ceramics in the system $Li_2O-Al_2O_3-GeO_2-P_2O_5$" Solid State Ionics 104 (1997), pp. 191-194.
Aono, et al., "DC Conductivity of $Li_{1.3}Al_{0.3}Ti_{1.7}(PO_4)_3$" Ceramic with Li Electrodes, Chemistry Letters, 1991, pp. 1567-1570.
Aono, et al., "Electrical Properties of Sintered Lithium Titanium Phosphate Ceramics ($Li_{1+x}M_xTi_{2-x}PO_4)_3,M^{3+}=Al^{3+},Sc^{3+}$, or $Y^{3+}$)", Chemistry Letters, 1990, pp. 1825-1828.

(56) References Cited

OTHER PUBLICATIONS

Button, et al., "Structural disorder and enhanced ion transport in amorphous conductors", Solid State Ionics, vols. 9-10, Part 1, Dec. 1983, pp. 585-592 (abstract).
Shuster, Nicholas, "LithiumWater Power Source for Low Power—Long Duration Undersea Applications", Westinghouse Electric Corporation, 1990 IEEE, pp. 118-123.
VanVoorhis, et al., "Evaluation of Air Cathodes for Lithium/Air Batteries", Electrochemical Society Proceedings vol. 98-16, 1999, pp. 383-390.
Blurton et al., "Metal/Air Batteries: Their Status and Potential—A Review", Journal of Power Sources, 4, (1979), pp. 263-279.
J. Read, "Characterization of the Lithium/Oxygen Organic Electrolyte Battery", Journal of the Electrochemical Society, 149 (9) (2002), pp. A1190-A1195.
Abraham et al., "A Polymer Electrolyte-Based Rechargeable Lithium/Oxygen Battery", Technical Papers, Electrochemical Science and Technology, J. Electrochem. Soc., vol. 143, No. 1, Jan. 1996, pp. 1-5.
Kessler, et al., "Large Microsheet Glass for 40-in. Class PALC Displays", 1997, FMC2-3, pp. 61-63.
Feng et al., "Electrochemical behavior of intermetallic-based metal hydrides used in Ni/metal hydride (MH) batteries: a review", International Journal of Hydrogen Energy, 26 (2001), pp. 725-734.
Iwakura et al., "All solid-state nickel/metal hydride battery with a proton-conductive phosphoric acid-doped silica gel electrolyte", Electrochimica Acta 48 (2003), pp. 1499-1503.
Li et al., "Lithium-Ion Cells with Aqueous Electrolytes", J. Electrochem. Soc., vol. 142, No. 6, Jun. 1995, pp. 1742-1746.
Zhang et al., "Electrochemical Lithium Intercalation in $VO_2(B)$ in Aqueous Electrolytes", J. Electrochem. Soc., vol. 143, No. 9, Sep. 1996, pp. 2730-2735.
Urquidi-Mcdonald, Mirna, "Hydrogen storage and semi-fuel cells", http://engr.psu.edu/h2e/Pub/Macdonald1.htm, (downloaded Jan. 27, 2004, 3 pages).
Urquidi-Mcdonald, et al., "Lithium/poly(organophosphazene) membrane anodes in KOH and seawater", Electrochimica Acta 47, (2002), pp. 2495-2503.
Nimon et al., "Stability of Lithium Electrode in Contact with Glass Electrolytes", SSI-14, Jun. 22-27, 2003, Monterey, CA. (conference poster).
Nimon et al., "Stability of Lithium Electrode in Contact with Glass Electrolytes", SSI-14 Conference, Monterey, CA, Jun. 22, 2003, Abstract of Poster.
Inaguma et al., "High Ionic Conductivity in Lithium Lanthanum Titanate", Solid State Communications, vol. 86, No. 10, pp. 689-693, 1993.
AU patent application No. 2003301383, Examination Report mailed Sep. 29, 2008.
CN patent application No. 200480042697.3, Office Action mailed Feb. 15, 2008.
U.S. Appl. No. 11/245,472, Office Action mailed Jul. 24, 2008.
CN patent application No. 200480042697.3, Office Action mailed Dec. 19, 2008.
Thokchom, Joykumar S., et al., Water Durable Lithium Ion Conducting Composite Membranes from the $Li_2O-Al_2O_3-TiO_2-P_2O_5$ Glass-Ceramic, *Journal of The Electrochemical Society*, 154 (4), 2007, pp. A331-A336.
U.S. Appl. No. 11/245,472, Office Action mailed Jan. 8, 2009.
U.S. Appl. No. 11/824,579, Office Action mailed Jan. 29, 2009.
U.S. Appl. No. 11/823,847, Office Action mailed Apr. 28, 2009.
CN patent application No. 200480042697.3, Office Action mailed Jun. 5, 2009.
U.S. Appl. No. 11/245,472, Office Action mailed Jul. 8, 2009.
AU patent application No. 2004306866, Exam Report mailed Apr. 9, 2009.
AU patent application No. 2004316638, Office Action mailed Aug. 3, 2009.
U.S. Appl. No. 10/986,441, Notice of Allowance mailed Jun. 19, 2009.
U.S. Appl. No. 10/772,157, Notice of Allowance mailed Sep. 17, 2009.
International patent application No. PCT/US06/48755, International Search Report mailed Apr. 7, 2008.
International patent application No. PCT/US06/48755, Written Opinion mailed Apr. 7, 2008.
Ogasawara T. et al., "Rechargeable $Li_2O_2$ Electrode for Lithium Batteries", J. Am. Chem. Soc. 128(4), 2006, pp. 1390-1393.
Foster D.L. et al., "Ceramic Membranes for Lithium Batteries", Proceeding of the $42^{nd}$ Power Sources Conference, Jun. 2006, p. 2.14.
Read J. "Electrolyte Formulation and Temperature Performance of the $Li/O_2$ Battery", Proceeding of the $9^{th}$ Electrochemical Power Sources R&D Symposium, Jun. 2005, 15 pages.
EP patent application No. 04794699.1, Notice of Allowance mailed Jun. 10, 2009.
U.S. Appl. No. 12/334,116, Office Action mailed Oct. 27, 2009.
EP patent application No. 03809186.4, Examination Report mailed Nov. 24, 2009.
U.S. Appl. No. 11/824,548, Notice of Allowance mailed Dec. 17, 2009.
U.S. Appl. No. 11/245,472, Office Action mailed Feb. 4, 2010.
U.S. Appl. No. 12/475,403, Office Action mailed Feb. 8, 2010.
AU patent application No. 2003301383, Notice of Acceptance mailed Nov. 26, 2009.
CN patent application No. 200480037293.5, Office Action mailed Jan. 29, 2010.
EP patent application No. 04794655.3, Examination Report mailed Apr. 22, 2010.
CA patent application No. 2,502,438, Examination Report mailed May 12, 2010.
U.S. Appl. No. 11/562,883, Office Action mailed Jun. 7, 2010.
AU patent application No. 2006280097, Examination Report mailed Jun. 9, 2010.
JP patent application No. 2004-545584, Notification of reason for rejection mailed Jun. 8, 2010.
U.S. Appl. No. 12/475,403, Office Action mailed Jun. 22, 2010.
U.S. Appl. No. 11/824,579, Office Action mailed Jun. 25, 2010.
CN patent application No. 200480037293.5, Office Action mailed Jun. 24, 2010.
AU patent application No. 2004306866, Notice of Acceptance mailed Jun. 17, 2010.
U.S. Appl. No. 12/831,066, "Active Metal Fuel Cells", Visco et al., filed Jul. 6, 2010.
U.S. Appl. No. 12/649,245, Office Action mailed Jul. 19, 2010.
U.S. Appl. No. 12/831,066, Office Action mailed Aug. 18, 2010.
U.S. Appl. No. 11/824,597, Notice of Allowance mailed Sep. 9, 2010.
KR patent application No. 10-2005-7006382, Office Action mailed Aug. 31, 2010.
U.S. Appl. No. 12/475,403, Notice of Allowance mailed Oct. 7, 2010.
U.S. Appl. No. 12/907,819, "In situ formed ionically conductive membranes for protection of active metal anodes and battery cells", Visco et al., filed Oct. 19, 2010.
Thangadurai, Venkataraman et al., "Novel fast lithium ion conduction in garnet-type $Li_5La_3M_2O_{12}$ (M = Nb, Ta)", J. Am. Chem. Soc. 86 (3) 437-40 (2003), Oct. 21, 2002.
U.S. Appl. No. 12/649,245, Office Action mailed Nov. 30, 2010.
U.S. Appl. No. 11/612,741, Office Action mailed Nov. 29, 2010.
U.S. Appl. No. 11/562,883, Office Action mailed Jan. 19, 2011.
U.S. Appl. No. 12/831,066, Office Action mailed Jan. 19, 2011.
CA patent application No. 2,542,304, Examination Report mailed Apr. 4, 2011.
U.S. Appl. No. 12/831,066, Notice of Allowance mailed Apr. 6, 2011.
U.S. Appl. No. 12/907,819, Office Action mailed May 12, 2011.
Visco, S.J. et al., "Lithium-Air", Encyclopedia of Electrochemical Power Sources, Dyer (editor), Elsevier, 2009, ISBN: 9780444527455, pp. 376-383.
CA patent application No. 2,555,637, Exam Report mailed May 10, 2011.
KR patent application No. 10-2006-7017692, Notice to Submit Response mailed May 13, 2011.
JP patent application No. 2006-535572, Office Action mailed Jun. 21, 2011.

(56) References Cited

OTHER PUBLICATIONS

JP patent application No. 2006-552102, Office Action mailed Jul. 5, 2011.
U.S. Appl. No. 11/612,741, Office Action mailed Jul. 22, 2011.
U.S. Appl. No. 12/649,245, Notice of Allowance mailed Sep. 14, 2011.
KR patent application No. 2006-7007309, Office Action mailed Jul. 27, 2011.
KR patent application No. 2005-7006382, Office Action mailed Aug. 10, 2011.
U.S. Appl. No. 12/907,819, Notice of Allowance mailed Nov. 10, 2011.
U.S. Appl. No. 13/236,428, Office Action mailed Nov. 16, 2011.
U.S. Appl. No. 13/336,459, "Solid State Battery", Visco et al., filed Dec. 23, 2011.
CN patent application No. 200910174918.7, Office Action mailed Oct. 19, 2011.
U.S. Appl. No. 11/612,741, Notice of Allowance mailed Feb. 3, 2012.
CA patent application No. 2,542,304, Exam Report mailed Apr. 3, 2012.
KR patent application No. 9-5-2012-016417008, Office Action mailed Mar. 21, 2012.
U.S. Appl. No. 13/236,428, Notice of Allowance mailed Apr. 25, 2012.
U.S. Appl. No. 12/888,154, Office Action mailed May 3, 2012.
KR patent application No. 10-2005-7006382, Office Action mailed Mar. 31, 2012.
U.S. Appl. No. 13/464,835, "Protected lithium electrodes having tape cast ceramic and glass-ceramic membranes," Visco et al., filed May 4, 2012.
U.S. Appl. No. 13/336,459, Office Action mailed Jun. 7, 2012.
U.S. Appl. No. 13/453,964, "Substantially impervious lithium super ion conducting membranes," Visco et al., filed Apr. 23, 2012.
U.S. Appl. No. 13/182,322, Office Action mailed Jul. 5, 2012.
EP patent application No. 03809186.4, Exam Report mailed Jun. 21, 2012.
U.S. Appl. No. 13/453,964, Notice of Allowance mailed Aug. 14, 2012.
U.S. Appl. No. 12/888,154, Notice of Allowance mailed Aug. 20, 2012.
U.S. Appl. No. 13/464,835, Office Action mailed Sep. 25, 2012.
U.S. Appl. No. 13/182,322, Notice of Allowance mailed Sep. 19, 2012.
JP patent application No. 2006-552102, Office Action mailed Sep. 25, 2012.
KR patent application No. 10-2005-7006382, Notice to Submit Response mailed Oct. 30, 2012.
U.S. Appl. No. 13/475,324, "Aqueous electrolyte lithium sulfur batteries," Visco et al., filed May 18, 2012.
U.S. Appl. No. 13/676,487, "Aqueous electrolyte lithium sulfur batteries," Visco et al., filed Nov. 14, 2012.
Licht et al., "A solid sulfur cathode for aqueous batteries," Science, vol. 261, No. 5124 (Aug. 20, 1993) 1029-1032.
Licht et al., "Investigation of a novel aqueous aluminum/sulfur battery," Journal of Power Sources, 45 (1993) 311-323.
WO patent application No. PCT/US2012/065251, International Search Report and Written Opinion mailed Mar. 28, 2013.
U.S. Appl. No. 13/161,351, Office Action mailed Jul. 12, 2013.
U.S. Appl. No. 13/161,351, Notice of Allowance mailed Apr. 17, 2014.
Kobayashi et al., "All-solid-state lithium secondary battery with ceramic-polymer composite electrolyte", Solid State Ionics 152-153 (2002) 137-142.
Will et al., "Primary Sodium Batteries with Beta-Alumina Solid Electrolyte", J. Electrochemical Science and Technology, Apr. 1975, vol. 122, No. 4, pp. 457-461.
EP patent application No. 03809186.4, Examination Report dated Mar. 21, 2006.
International patent application No. PCT/US2004/033371, International Search Report dated Mar. 6, 2006.
International patent application No. PCT/US2004/033424, International Search Report dated Jan. 6, 2006.
Galbraith, A.D., "The lithium-water-air battery for automotive propulsion", XP002355800, retrieved from STN Database accession No. 1979:106901 abstract and Symp. Int. Veh. Electr., Rapp, $4^{th}$ vol. 1, paper 32.4, 23 pp., Publisher: Electr. Veh. Counc., New York, N.Y. Conden: 39UPAD, 1976.
International patent application No. PCT/US2004/033361, International Search Report and Written Opinion dated Jan. 16, 2006.
International patent application No. PCT/US2004/033424, International Search Report and Written Opinion dated Mar. 6, 2006.
West, et al., "Chemical stability enhancement of lithium conducting solid electrolyte plates using sputtered LiPON thin films", Journal of Power Sources, vol. 126, Issues 1-2, pp. 1-272 (Feb. 16, 2004).
International patent application No. PCT/US2004/033424, Invitation to Pay Additional Fees dated Jan. 6, 2006.
EP patent application No. 04794699.1, Examination Report dated May 31, 2007.
WO patent application No. PCT/US06/45407, International Search Report and Written Opinion, mailed Aug. 30, 2007.
CN patent application No. 200480037293.5, Office Action mailed Aug. 22, 2008.
EP patent application No. 04794699.1, Examination Report mailed Aug. 5, 2008.

\* cited by examiner

US 8,828,573 B2

ELECTRODE STRUCTURES FOR AQUEOUS ELECTROLYTE LITHIUM SULFUR BATTERIES

CROSS-REFERENCE TO RELATED APPLICATIONS

This application claims priority to U.S. Provisional Patent Application Nos. 61/585,589 filed Jan. 11, 2012, titled AQUEOUS LITHIUM-SULFUR BATTERY CELL, and 61/560,134 filed Nov. 15, 2011, titled AQUEOUS LITHIUM-SULFUR BATTERY, which are incorporated herein by reference in their entirety and for all purposes.

FIELD OF THE INVENTION

The present invention relates generally to the field of electrochemical energy storage and power delivery. In particular, the present invention is directed to aqueous lithium-sulfur battery cells, including flow cells, and methods of making such cells.

BACKGROUND OF THE INVENTION

The lithium sulfur battery has a theoretical capacity of 1675 mAhg$^{-1}$ and approximately 2300 Wh/kg. The low cost and exceptionally high specific capacity of sulfur renders it an especially attractive battery cathode material for large-scale energy storage, including electric vehicle and grid storage applications. Yet after more than twenty years of research and development at various battery companies and scientific institutions worldwide, key technical problems with the sulfur electrode have precluded meaningful commercialization of the Li—S battery.

SUMMARY OF THE INVENTION

In one aspect the invention provides an aqueous lithium sulfur battery cell having an anode structure comprising an electro-active component material, a cathode comprising a solid electron transfer medium, an aqueous electrolyte in contact with the electron transfer medium, and active sulfur species in contact with the aqueous electrolyte, and wherein the anode electroactive material is isolated from direct contact with the aqueous electrolyte. Notably, while the anode electroactive material is isolated from touching (i.e., directly contacting) the aqueous electrolyte, it is nonetheless configured in the anode structure to be in lithium ion communication with the aqueous electrolyte. Moreover, because the aqueous electrolyte does not touch the anode electro-active material but does directly contact the cathode the term "aqueous catholyte" (or more simply "catholyte") is used interchangeably with the term "aqueous electrolyte".

In various embodiments the aqueous electrolyte is electroactive in that it contains dissolved active sulfur species that undergo electrochemical redox at the cathode during discharge and charge. Without limitation, the dissolved redox active sulfur species may include sulfide anions ($S^{2-}$), hydrosulfide anions ($HS^-$), and polysulfide anions including $S_x^{2-}$ with x>1 and hydropolysulfide anions ($HS_x^-$ with x>1), and combinations thereof.

In accordance with the present invention, the amount of water in the catholyte is significant (i.e., not merely a trace amount). In various embodiments the volume percent of water relative to the total liquid solvent volume in the catholyte is greater than 5%, 10%, 20%, 30%, 40%, 50%, 60%, 70%, 80%, and greater than 90%. In certain embodiments water is the only liquid solvent in the catholyte (i.e., water constitutes 100% of the solvent volume of the catholyte). In various embodiments water is the main liquid solvent in the catholyte. By use of the term main liquid solvent, it is meant that the volume percent of water in the catholyte is greater than the volume percent of any other liquid solvent.

Water has unique properties. In the aqueous sulfur catholyte solutions described herein, the presence of water provides a number of benefits, including high solubility for active sulfur species, including lithium sulfide ($Li_2S$), very high ionic conductivity even at high sulfur concentrations, and fast dissolution kinetics. The combination of high solubility, high conductivity, and fast dissolution kinetics provides compelling lithium sulfur battery performance.

Accordingly, in various embodiments the cell is fabricated with an aqueous catholyte having a high concentration of active sulfur species already dissolved therein. In other words, the cell has a significant amount of dissolved active sulfur species adjacent the electron transfer medium even before the cell has been initially operated (e.g., initially discharged) and by this expedient the fast electro-kinetics of solution phase redox can be used to advantage, especially, but not exclusively, for applications that require high current drain immediately upon start up. For instance, in various embodiments, prior to initially operating the cell, the active sulfur concentration in the aqueous electrolyte is greater than 0.5 molar sulfur, 1 molar sulfur, 2 molar sulfur, 3 molar sulfur, 4 molar sulfur, 5 molar sulfur, 6 molar sulfur, 7 molar sulfur, 8 molar sulfur, 9 molar sulfur, 10 molar sulfur, 11 molar sulfur, or greater than 12 molar sulfur. Herein and in the claims, by the use of the term "molar sulfur" it is meant the number of moles of sulfur per liter of electrolyte. Moreover, by use of the phrase "just prior to initially operating the cell" or "prior to initial cell operation" it is meant, herein and in the claims, to mean the first (i.e., initial) electrochemical operation activated by the user and specifically it refers to one or the other of cell discharge or cell charge, whichever is caused to occur, by the user, first. In other words, incidental self-discharge (e.g., on storage) does not qualify herein or in the claims as an initial cell operation.

Moreover, because it can be difficult to identify the precise chemical nature of the various active sulfur species existing in the catholyte solution, the composition of the active species in the catholyte (i.e., active catholyte composition) is sometimes expressed herein, and in the claims, in terms of an "active lithium sulfur stoichiometric ratio" or more simply an "active stoichiometric ratio" which is the ratio of active sulfur to active lithium dissolved in the electrolyte, and represented by the general formula $Li_2S_x$. Furthermore, it should be understood that the "active stoichiometric ratio" as used herein is exclusive of any non-active lithium salts and/or non-active sulfur salts that may be added to the electrolyte for any purpose, including, e.g., to enhance lithium ion conductivity in the case of, e.g., a non-active LiCl salt, or a non-active sulfur containing salt such as, e.g., $LiSO_3CF_3$.

Accordingly, in various embodiments, the active lithium sulfur stoichiometric ratio in the catholyte prior to, in particular just prior to, initial cell operation is $Li_2S$; $Li_2S_x$ (x>1); $Li_2S_x$ (1<x<5); $Li_2S_5$; or $Li_2S_x$ (x>5), and the concentration of the dissolved active sulfur species is typically significant, e.g., greater than 1 molar sulfur. For instance, in particular embodiments, especially for cells using a lithium metal or lithium alloy as the electro-active anode material, the active stoichiometric ratio just prior to initial cell operation is $Li_2S_x$ with the following range for x: 2≤x≤5, and the active sulfur concentration is between 10 to 17 molar sulfur. For example, a catholyte composition having an active stoichiometric ratio of about $Li_2S_4$, and at concentrations greater than 10 molar sulfur (e.g., 11, 12, 13, 14, 15, 16 or 17 molar sulfur). In another particular embodiment, especially useful for cells which are fabricated in the fully or mostly discharged state (e.g., having an anode electroactive material that is devoid of active lithium), the active stoichiometric ratio of the catholyte just prior to initial cell operation is $Li_2S$, and the active sulfur concentration is typically greater than 1 molar sulfur, and preferably greater than 2 molar sulfur, and more preferably greater than 3 molar sulfur (e.g., 3 molar, 4 molar, or 5 molar sulfur).

Another advantage of the aqueous catholyte is that it may serve as a medium into which high concentrations of fully or partially reduced active sulfur species (e.g., $Li_2S$) may be quickly dissolved during charge. By this expedient high capacity cells in accordance with embodiments of the instant invention may be deeply discharged repeatedly since the cell reaction product on discharge (e.g., $Li_2S$) is readily dissolved and therefore more readily oxidized on charge. Thus, in various embodiments, the cell is formulated and operated such that a significant portion of the sulfur ampere-hour capacity, at the end of discharge, is present in the form of solid phase lithium sulfide.

Furthermore, the combination of high solubility and fast dissolution kinetics of $Li_2S$ in water also enables a practical method of making an aqueous lithium sulfur cell that is assembled in the fully discharged state, and which makes use of alternative anode electro-active materials that are different than that of lithium metal, such as carbon intercalation materials, alloys (e.g., of silicon) and combinations thereof such as carbon silicon composites. For example, one method in accordance with the present invention involves: i) providing a carbon anode in the fully discharged state (i.e., entirely un-intercalated); ii) providing an aqueous sulfur catholyte comprising water and dissolved lithium sulfide; iii) providing a cathode comprising an electron transfer medium for electrochemical oxidation of dissolved lithium sulfide; iv) configuring the anode, catholyte and cathode into a battery cell; and iv) charging the battery cell. Accordingly, in various embodiments the instant cell comprises both dissolved lithium sulfide and a significant amount of solid phase lithium sulfide in contact with the aqueous electrolyte. For instance, in various embodiments the molar quantity of active sulfur as solid phase lithium sulfide is greater than that of active sulfur dissolved in the electrolyte by a factor of at least 2, or at least 3, or at least 5 or at least 10. Moreover, in the same or separate embodiments, the full charge capacity of the cell just prior to initial cell operation is derived from the ampere-hour capacity of dissolved active sulfur species in the catholyte combined with the ampere-hour capacity of solid phase lithium sulfide. Furthermore, in the same or separate embodiments upon cell fabrication and just prior to initial cell operation the anode electro-active material is substantially devoid of active lithium, and the initial cell operation is to charge the battery. For example, the anode electro-active material may be an intercalation material capable of electrochemically intercalating lithium upon electro-reduction in the presence of lithium ions, or an alloying material capable of electrochemically alloying with lithium upon electro-reduction in the presence of lithium ions, or a material capable of forming a lithium inter-metallic phase upon electro-reduction in the presence of lithium ions. For example, in particular embodiments the anode electro-active material is an intercalating carbon, silicon, or a composite of said silicon and carbon.

In applications where high pulse power and size are paramount performance benefit may be gained by taking advantage of the facile electro-kinetics of solution phase redox in combination with the high solubility of polysulfide species in water. For instance, in various embodiments, the cell is formulated and operated such that the ampere-hour capacity in the cell, at full state of charge, is solely present as dissolved active sulfur species in the catholyte. In particular the cell may be fabricated in the fully charged state devoid of solid phase active sulfur (e.g., devoid of elemental sulfur).

The use of water as a catholyte solvent clearly provides considerable benefit, but it also presents significant challenges in a lithium-sulfur battery. In particular, the use of water is constrained by its reactivity with electro-active lithium materials (e.g., lithium metal). Accordingly, the present invention makes use of lithium anode structures wherein the electro-active lithium is isolated from contacting the aqueous sulfur catholyte. In various embodiments, a protected lithium electrode is employed which contains a lithium electro-active material protected from the external environment by a substantially impervious lithium ion conductive protective membrane architecture. Thus in accordance with the instant invention the aqueous catholyte is disposed in the cell such that it directly contacts the electron transfer medium but does not contact the electro-active component material of the anode (e.g., lithium metal or carbon intercalation material).

A further challenge to the use of water in a lithium-sulfur cell is the hydrolysis of dissolved lithium sulfide ($Li_2S$) in the catholyte and the resulting generation of hydrogen sulfide ($H_2S$). According to some embodiments of the present invention, a lithium-sulfur cell can comprise a housing configured to contain and withstand the pressure of such gas generation to maintain cell integrity and safety. According to further embodiments, the pH of the electrolyte (catholyte) can be adjusted to reduce or prevent $Li_2S$ hydrolysis. This is particularly achieved with basic pHs, for example greater than 7, or from about 9 to 12 and up to 14. However, the invention is not limited to basic electrolytes, and it is contemplated herein that the pH may be adjusted to values below pH 7 (i.e., acidic) or about pH 7 (i.e., neutral catholyte) using acidic salts and buffering agents.

Further relating to suitable electrolyte/catholyte formulations in accordance with the present invention, compositions and methods are provided to enhance contact between the aqueous electrolyte and the cathode electron transfer medium, for example an electronically conductive matrix such as a carbon or metal mesh, foam or other high surface area, typically porous, structure. Such improved contact enhances utilization and rate performance of the cell. Electrolyte/catholyte compositions in this regard can include a surfactant to wet the catholyte to the conductive matrix. Also or alternatively, the matrix can be surface treated prior to contact with the electrolyte to enhance wetting, for example being soaked in a wetting agent, followed by displacement of the wetting agent with the aqueous catholyte solution of polysulfides. Still further in this regard, the catholyte may include dissolved organosulfur as a cathode active material. The organosulfur compound or compounds can self-wet to the cathode electron transfer matrix Another aspect of the present invention relates to the challenge presented in an aqueous lithium-sulfur battery with regard to the voltage stability window of water and the active sulfur (e.g., dissolved polysulfide) redox potentials. In order to expand the redox potential window in which an aqueous lithium-sulfur battery cell may operate without generating hydrogen and oxygen from the water in the electrolyte, battery cells in accordance with embodiments of the present invention may include a material with a high overpotential for hydrogen ($H_2$) and/or oxygen ($O_2$) in the cathode, in particular as or as part of the electron transfer medium of the cathode. For example, a cathode matrix can be formed from a metal with a high overpotential for $H_2$, such as lead (Pb). Or, a metal with a high overpotential for $H_2$ (and/or $O_2$) can be coated as an exterior layer on an underlying matrix structure (also sometimes referred to herein as a "core" or "core structure"). In some such embodiments, the underlying matrix structure can be an electronic insulator (e.g., a glass or polymer) so that discontinuities in the coating do not result in the generation of hydrogen (or oxygen) gas at an underlying conductor's surface. By providing a cathode electron transfer medium with a high overpotential for $H_2$ and/or $O_2$ battery cells in accordance with the present invention have an extended operating potential range, beyond that of the potential window of water.

Yet another aspect of the present invention relates to compositions defining the exterior surface of the cathode electron transfer medium (e.g., matrix) that electro-catalyze sulfur redox but also have a high overpotential for $H_2$, such as metal sulfides (e.g., lead sulfide, cadmium sulfide, cobalt sulfide and nickel sulfide) and in this way can provide both catalysis and high overpotential for $H_2$ as described above. Such coatings should allow effective electron tunneling so as not to disrupt the electron transfer function of the matrix. The coatings may be applied to a conventional conductive matrix material, such as carbon, or to a matrix material having a high overpotential for $H_2$, such as described above.

In yet another aspect the present invention relates to catholyte formulations including the incorporation of one or more non-aqueous solvents for particular benefit. Non-aqueous solvents suitable for use herein to improve performance of the instant aqueous lithium sulfur battery cells include aprotic and protic organic solvents and ionic liquids.

In particular embodiments the aqueous catholyte comprises water and a protic solvent that is non-aqueous, especially protic organic solvents that are capable of dissolving a significant amount of $Li_2S$ (e.g., methanol). Addition of the non-aqueous protic solvent is particularly useful in cells that may be operated at temperatures below the freezing temperature of water and yet still require high solubility for lithium sulfide. Accordingly, in various embodiments the catholyte is formulated with an amount of a non-aqueous protic solvent (e.g., ethylene glycol) sufficient to achieve a freezing point temperature (i.e., melt temperature) below a desired value; for example, below $-5°$ C., $-10°$ C., $-20°$ C., $-30°$ C. or $-40°$ C.

While the invention has generally been described with reference to an electro-active catholyte (i.e., a catholyte containing dissolved active sulfur species) and/or electro-active fully reduced solid phase lithium sulfide loaded in the cathode, the invention is not limited as such, and it is contemplated that fully oxidized solid phase electro-active sulfur (e.g., elemental sulfur) or active organosulfur compounds may be incorporated in the cell during fabrication as an exclusive source of active sulfur or in combination with an electroactive sulfur catholyte. Notwithstanding the aforementioned sulfur containing cathode configurations, in various embodiments the cell is fabricated absent elemental sulfur, and the cathode is, thereby, devoid of elemental sulfur just prior to initial cell operation.

The invention also relates to methods of manufacture of aqueous lithium-sulfur battery cells. In one aspect, such a method involves de-oxygenating the catholyte and forming and sealing the cell in an inert or reducing environment devoid of molecular oxygen (e.g., a nitrogen environment) in order to reduce or eliminate free oxygen ($O_2$) in the catholyte solution. In this way the irreversible oxidation of sulfur species in the aqueous catholyte (e.g., oxidation leading to insoluble thiosulfates) and the resultant loss of active material, is reduced or avoided.

In various embodiments the instant cells are self-contained and sealed in a hermetic casing wherein the entirety of the cell capacity is derived from electro-active sulfur and electro-active lithium disposed in the casing during cell manufacture. These fully sealed cells may be of the primary or secondary type.

In other embodiments the instant cells are configured in a battery flow cell system, wherein an aqueous sulfur catholyte is caused to flow, and/or circulate, into the cell, and, in various embodiments, through an inter-electrode region between the lithium anode and the cathode electron transfer medium. In some embodiments both the aqueous catholyte and the electro-active lithium are flowable and during operation are caused to flow through the cell.

It should be understood that aqueous lithium-sulfur battery cells in accordance with the present invention are not merely different from conventional non-aqueous Li—S battery cells by their substitution of a non-aqueous electrolyte solvent with an aqueous electrolyte solvent system. The use of water in the electrolyte results in a solvent system that is not just a spectator, but actually participates in the electrochemical reactions at the cathode, reacting to form and dissolve new species. The present invention is therefore directed to an entirely new class of battery cells having entirely different chemistry than conventional Li—S battery cells (as evidenced by the dramatic difference in their voltage profiles), and to the formulation, engineering, operation and manufacturing challenges associated therewith.

These and other aspects of the present invention are described in more detail, including with reference to figures, in the description which follows.

DETAILED DESCRIPTION OF SPECIFIC EMBODIMENTS

Reference will now be made in detail to specific embodiments of the invention. Examples of the specific embodiments are illustrated in the accompanying drawings. While the invention will be described in conjunction with these specific embodiments, it will be understood that it is not intended to limit the invention to such specific embodiments.

On the contrary, it is intended to cover alternatives, modifications, and equivalents as may be included within the spirit and scope of the invention. In the following description, numerous specific details are set forth in order to provide a thorough understanding of the present invention. The present invention may be practiced without some or all of these specific details. In other instances, well known process operations have not been described in detail so as to not unnecessarily obscure the present invention.

Figure 1:
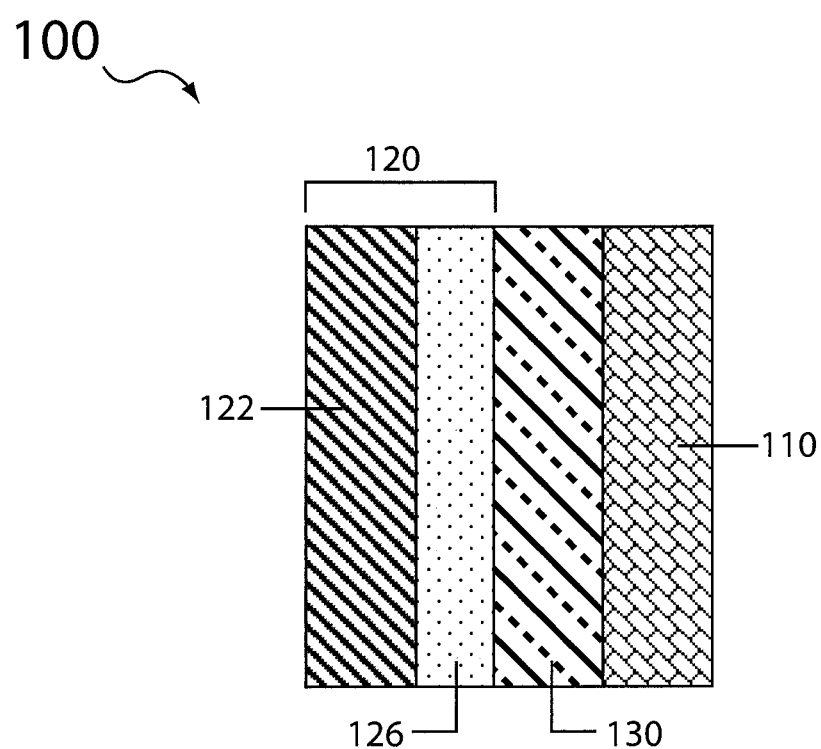
FIG. 1 is a schematic cross section of a battery cell in accordance with various embodiments of the present invention.

A lithium sulfur cell in accordance with various embodiments of the instant invention is shown in FIG. 1. The cell 100 includes a cathode 110 comprising an electron transfer medium, a protected lithium anode 120 and an aqueous electrolyte in contact with the electron transfer medium and also in contact with an exterior surface of the protected lithium anode.

The protected lithium anode 120 includes a lithium electroactive material layer 122 and a substantially impervious lithium ion conducting protective membrane architecture 126 on the surface of the lithium active layer 122. The membrane architecture is substantially impervious to water and has a first surface chemically compatible in contact with the lithium electroactive layer and a second surface, opposing the cathode, which is chemically compatible in contact with water, and in particular chemically compatible in contact with the catholyte employed in the cell. In some embodiments the cell further includes a porous separator material layer 130 interposed between the cathode and the protected anode, and containing in its pores at least a portion of the aqueous electrolyte (i.e., aqueous catholyte). In other embodiments the cell is absent a separator and it is contemplated herein that the membrane architecture second surface directly contacts the cathode, which, in said embodiments, is generally porous with catholyte filling the pore spaces.

Figure 2A:
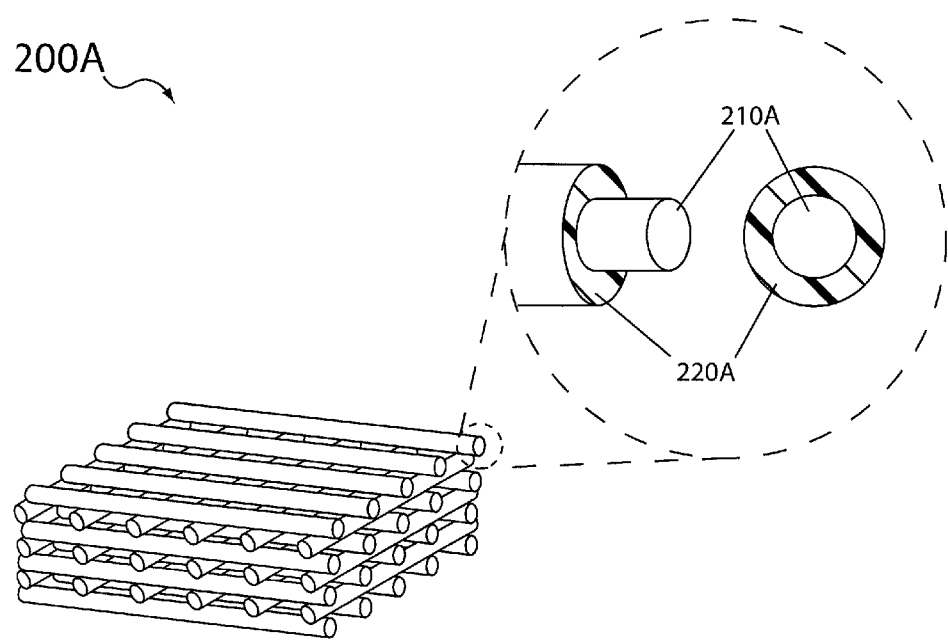
FIGS. 2A-B illustrates an electron transfer medium in accordance with various embodiments of the present invention.
Figure 2B:
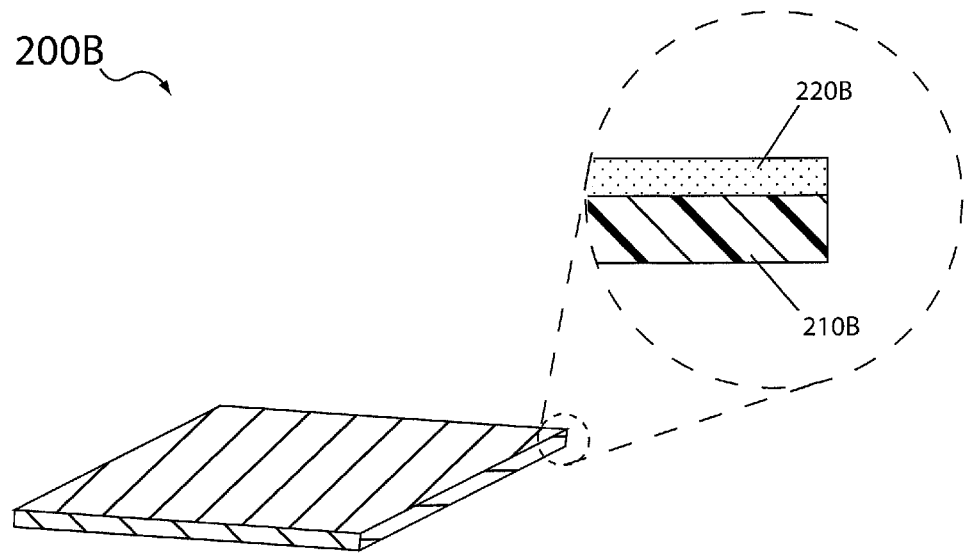

The cathode 110 includes a solid electron transfer medium having an "exterior surface" that is chemically compatible in contact with the catholyte and on which dissolved active sulfur species are electro-reduced during cell discharge and electro-oxidized on charge. With reference to FIGS. 2A-B, in various embodiments the electron transfer medium 200A/200B may be a porous three-dimensional structure 200A or planar 200B and substantially dense or otherwise porous (e.g., a planar mesh). Whether dense or porous, the medium should be sufficiently electronically conductive to support the electrical current through the cell and its exterior surface capable of supporting the electron transfer current. When porous, the solid electron transfer medium may take the form of a porous matrix such as a woven or non-woven fiber network (e.g., a metal or carbon fiber cloth or paper) or a through porous monolithic solid body (e.g., a metal or carbon foam). When planar, the medium may simply be a metal or carbonaceous sheet or foil or open mesh of sufficient thickness and conductivity to be self-supporting, or the planar medium may be a composite having a first layer, typically thin and electronically conductive, that defines the exterior surface and a second layer serving as a substrate support, and optionally further providing current collection when electronically conductive.

The electron transfer medium has an exterior surface that may be porous or dense but is defined, at least in part, by a material that, in contact with the catholyte, facilitates electron transfer, and, in particular, facilitates electrochemical redox of active sulfur species. Continuing with reference to FIGS. 2A-B, in various embodiments the electron transfer medium 200A/200B is a porous matrix composed of a core component (i.e., underlying matrix structure) 210A/210B having an exterior layer component 220A/220B that provides the exterior surface in contact with the catholyte. The core component generally provides substrate support and may, when conductive, facilitate current collection, whereas a primary function of the exterior layer is to provide some benefit to the electrochemical performance, and in particular that pertaining to electron transfer. The exterior layer may be porous or dense. In various embodiments, a dense exterior layer is also preferably contiguous and therefore substantially covers the core surface in its entirety. In other embodiments, a porous exterior layer is suitable, especially when the surface composition of the core is compatible with the catholyte and does not catalyze hydrogen evolution, as described in more detail below. Furthermore, when porous, the exterior layer may include high surface area particles that electro-catalyze sulfur redox and/or increases the effective surface area for electrical benefit.

In some embodiments the core, electronically conductive, supports current collection, while the exterior layer primarily serves to support and preferably enhance electrochemical sulfur redox. In other embodiments the core is electronically insulating and the exterior layer provides electron transfer and may provide some or all of the current collector function. The insulating core may be composed of any suitable insulating material of sufficient mechanical integrity and is preferably although not necessarily chemically compatible in contact with the catholyte. In certain embodiments the exterior layer is dense and substantially free of defects that otherwise would allow water from the electrolyte to seep into contact with the core material, and potentially reduce its strength or mechanical integrity. To prevent this from happening, in preferred embodiments the core material is also chemically compatible in contact with the catholyte and even more preferably is a material that does not swell or lose mechanical strength when in contact with water, and specifically does not mechanically degrade or change shape if exposed to the active electrolyte. In various embodiments additional layers may be incorporated between the insulating or conductive core and the exterior layer to support current collection and/or provide or improve interface compatibility and/or adhesion. For example, the insulating core of an underlying matrix structure may have a first metal coating (e.g., aluminum) serving as an intermediary layer to provide current collection and a second coating covering the aluminum that defines, in whole or in part, the exterior surface for the purpose of facilitating sulfur redox.

The electron transfer medium may be uncatalyzed, relying solely on the medium material (e.g., carbon) to facilitate the electrochemical redox reactions, or, in some embodiments, the electron transfer medium may contain a catalyst on its surface, such as a particulate catalyst or the catalyst may be formed on the underlying carbon or metal matrix as a coating. In some embodiments the exterior layer is a porous high surface area film composed of electronically conductive particles (e.g., high surface area carbons including nano-carbons, carbon blacks and functionalized carbons) that preferably electro-catalyze at least one or both of electro-reduction and electro-oxidation of active sulfur. In other embodiments, as described in more detail below, the exterior layer may be a dense, preferably thin, electronically conductive layer, such as a thin dense film of a metal, metal alloy, or metal compound (e.g., a metal sulfide) for the purposes of providing one or more of electronic conduction, facilitation of sulfur redox, and expansion of the voltage stability window of the catholyte, as described in more detail below.

Figure 3:
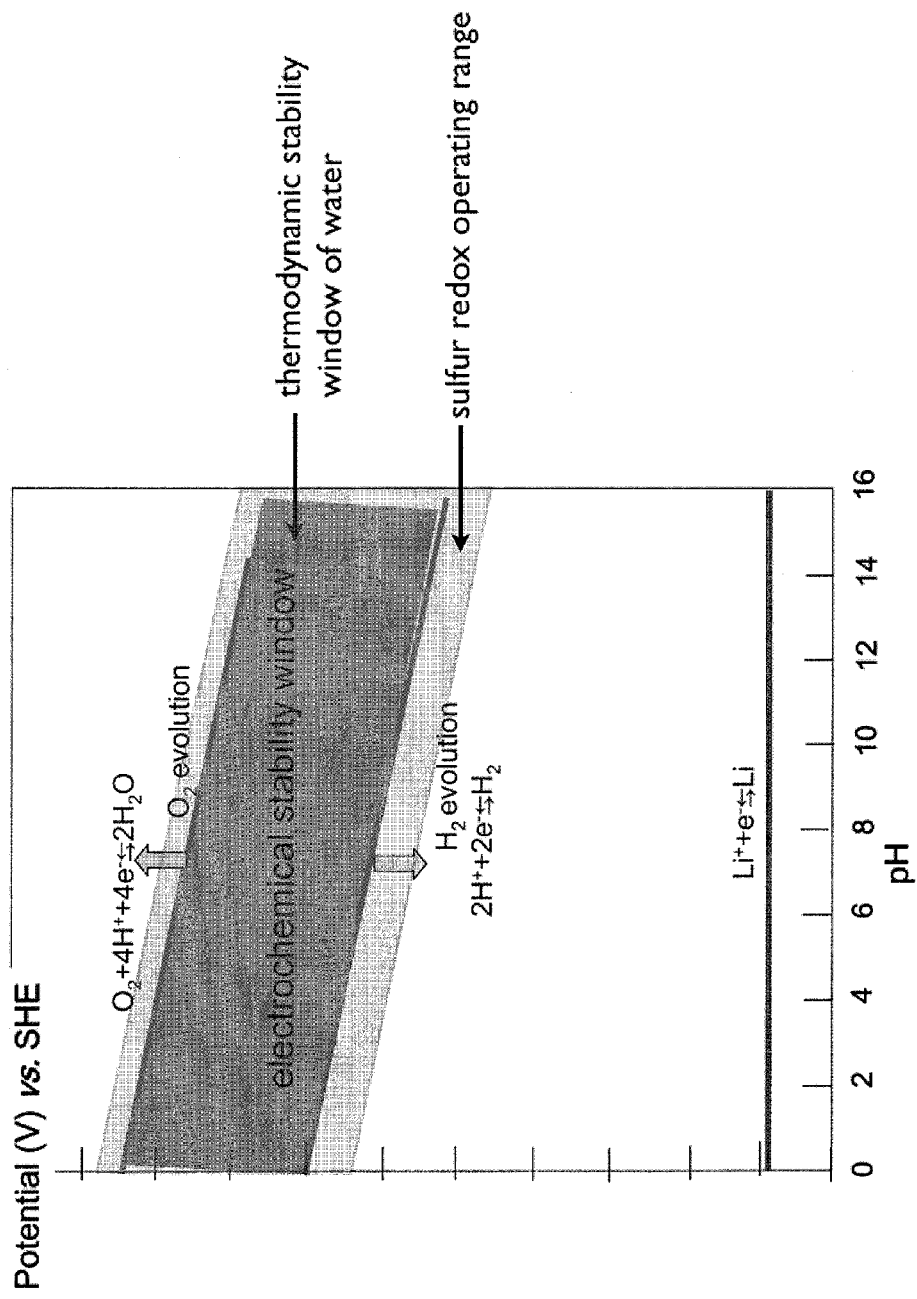
FIG. 3 is a qualitative illustration of a Pourbaix diagram for water and active sulfur species in catholyte in accordance with the present invention.
Figure 4:
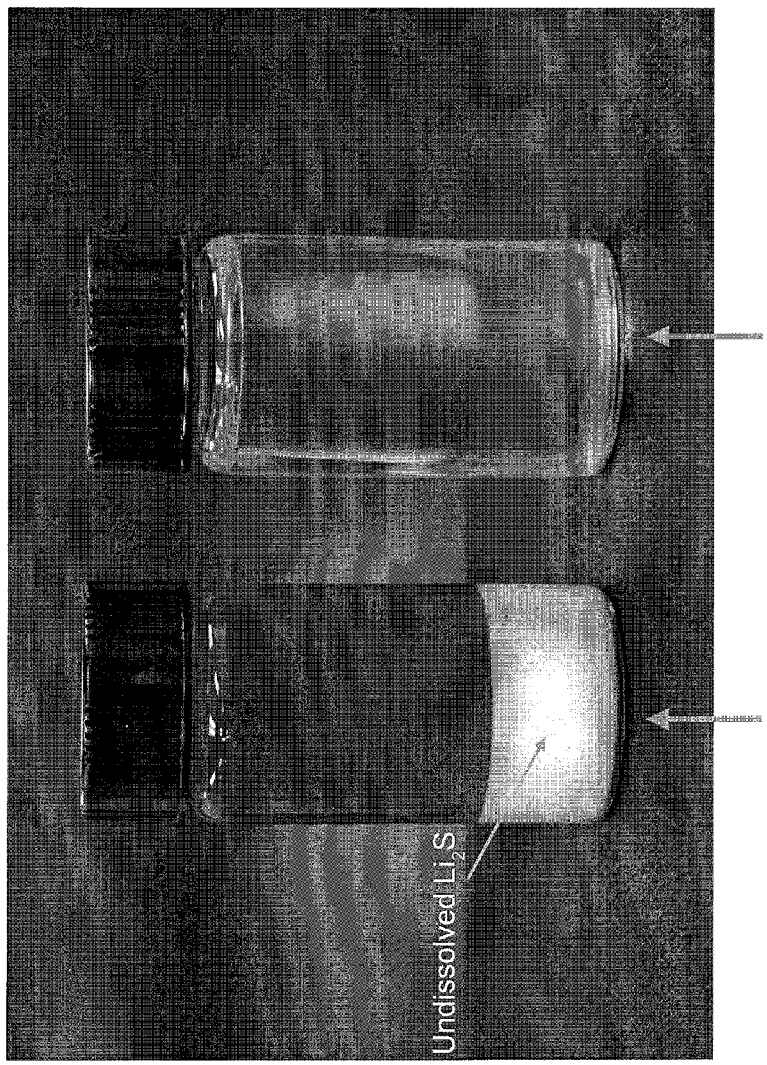
FIG. 4 is a photograph comparing the solubility of $Li_2S$ in water with that in a non-aqueous solvent.

With regard to the voltage window of the catholyte, a significant issue may arise during discharge once the cell voltage drops below a "critical voltage" corresponding to the thermodynamic potential for water reduction the cell electrochemistry is made complicated by the potentiality of water decomposition, and in particular $H_2$ evolution. The issue is illustrated pictorially with reference to FIG. 3, showing a Pourbaix diagram of water compared to an illustrative Pourbaix diagram of sulfur redox without assigning voltages to the sulfur electro-reduction/oxidation reactions. As can be seen in the illustration, the critical voltage varies with pH. For instance at pH 12 the critical voltage versus lithium is about 2.3 Volts and decreases with increasing pH values, reaching about 2.2 Volts at pH 14. As illustrated, albeit quite qualitatively, at cell voltages below the voltage stability window of water (i.e., below the critical voltage) there exist significant active sulfur ampere-hour capacity; however, the practicality of harnessing that capacity is complicated by water decomposition.

In this regard, the present invention provides cathode structures having electron transfer mediums that enable the instant cells to be discharged to voltages beyond the thermodynamic potential for water reduction, and thereby efficiently harness the additional ampere-hour capacity which exists at cell voltages below the critical voltage, and preferably do so without evolving any $H_2$. Accordingly, in various embodiments, the exterior surface of the electron transfer medium provides at least a dual functionality: a first function to facilitate electrochemical reduction/oxidation of the active sulfur species and a second function to inhibit hydrogen evolution. For example, the exterior surface may be defined in whole or in part by a material that facilitates sulfur redox but has a high overpotential for $H_2$ evolution. By this expedient the cell may be efficiently discharged to voltages below the critical voltage without evolving $H_2$. Preferably the exterior surface has an overpotential of at least 50 mV beyond the thermodynamic potential of water reduction, and in embodiments disclosed herein the overpotential is beyond 100 mV, beyond 200 mV, beyond 300 mV, beyond 400 mV, beyond 500 mV, beyond 600 mV, and in certain embodiments beyond 700 mV and beyond 800 mV. For instance, with regard to cell voltages, the use of high overpotential electron transfer medium allows cells of the instant invention to be discharged to cell voltages below 2.4 V, preferably below 2.3 V, even more preferably below 2.2V, below 2.1V and yet even more preferably below 2.0 V, below 1.9 V, below 1.8 V, below 1.7 V, below 1.6 V and below 1.5V.

Accordingly, in various embodiments at least a portion and in certain embodiments the entirety of the exterior surface of the electron transfer medium is defined by a material having a high overpotential for $H_2$ evolution. Suitable classes of such materials include metals, metal alloys (e.g., amalgams), and metal chalcogenides, especially metal sulfides. Particularly suitable metals include lead, cadmium, indium, nickel, gallium, tellurium, manganese, and zinc, or some combination thereof. Particularly suitable metal alloys include amalgams. Particularly suitable metal sulfides include cobalt sulfide, copper sulfide, nickel sulfide, and zinc sulfide, or some combination thereof. The thickness of the exterior layer is a tradeoff between burdening the cell with extra weight and other considerations such as one or more of the composition of the core material, mechanical strength, conductivity and coating process. For instance, in embodiments the exterior layer thickness may be in the range of 50 microns to values below 1 micron (e.g., about 0.5 microns or 0.25 microns). With regard to a metal sulfide exterior layer the composition may vary gradually or discretely across its thickness. For example, as described the exterior layer may be formed in two steps, first the metal of the metal sulfide may be coated, directly or indirectly, onto the core component surface, and then the metal layer sulfidized to form a thin layer of metal sulfide, which in embodiments may be thin and dense, for example less than 10 nm, e.g., about 5 nm, about 2 nm or about 1 nm. Such thin films are also self-healing in that if a portion of the metal sulfide film were to flake off or start cracking, the underlying metal layer surface would subsequently react with sulfur in the catholyte to reform the sulfide film.

In a particular embodiment the porous electron transfer medium is composed of a core component (e.g., a glass fiber mat) and a metal sulfide exterior layer (e.g., cobalt sulfide or lead sulfide). The core component may be electronically insulating, and the metal sulfide formed by first applying a layer of the metal of the sulfide on the core (e.g., coating the core with lead) and then sulfidizing the metal coated core surface via treatment in a sulfur containing environment. The metal layer may be applied using coating methods applicable for both electronically conductive and insulating core structures, as are known in the art generally, including evaporation, dip coating from the melt, electro-deposition and electro-less deposition. Alternatively, the core component may itself be composed of a material with a high overpotential for $H_2$ (e.g., a porous lead or porous cobalt matrix). However, the use of a heavy metal core material may unduly burden the overall cell weight, so in preferred embodiments the core material is composed of a material of light weight and preferably low density, such as carbon (e.g., graphitic like fibers or carbon foams), light weight metals such as aluminum, or inorganic materials such as silica or other glasses, or organic materials such as polymers (e.g., polymer fibers). Hollow cores are also contemplated herein for providing an exceptional lightweight advantage. Carbon is a particularly useful core material as it can be fabricated into a number of porous formats including porous fiber matrices and foams, and is also electronically conductive and thus capable of supporting current collection, which enables the use of exceptionally thin exterior layers. For example, less than 5 micron thick, preferably less than 1 micron, and even more preferably less than 0.5 micron, and yet even more preferably the thickness of the exterior layer is less than 0.25 microns. In the same or separate embodiments, especially when the core is electronically insulating, an intermediate electronically conductive layer (e.g., an aluminum layer) may be applied as a coating between the core and the exterior layer to provide current collection support or the exterior layer itself may be of sufficient thickness to support the electrical current. For instance an intermediate metal layer such as aluminum having thickness between 0.25 microns and 10 microns, and more preferably between 0.5 microns and 5 microns; for example, about 0.5 microns, about 1 micron, about 2 microns, about 3 microns, about 4 microns, and about 5 microns. Thereafter the exterior layer applied to the surface of the intermediary layer using one or more of the aforementioned coating techniques, or other coating techniques generally known in the arts.

In various embodiments, the composition of the exterior surface may be modified via surface treatments, and in particular, sulfidization to form a sulfide composition suitable for supporting, and preferably, electro-catalyzing sulfur redox. The step of sulfidization may be carried out in-situ within the cell by using a sulfur based catholyte. And while in-situ processing has the clear advantage of simplicity, it also leads to a concomitant loss in active sulfur cell capacity, since at least some of the sulfur that would have otherwise provided cell capacity is consumed by the sulfidization treatment, and for high surface area porous matrix structures, the loss of active sulfur capacity can be significant. Accordingly, in preferred embodiments for sulfidizing porous matrix structures, the sulfidization step is carried out ex-situ in a sulfur environment remote from the cell. For instance, the core material composed of the metal of the metal sulfide, or a core component coated with said metal may be placed in a bath of an aqueous lithium polysulfide solution similar to or identical in nature to the catholyte utilized in the cell, and allowed to stand in the bath for a time sufficient to form a substantially dense and pore free metal sulfide film.

Continuing with reference to FIG. 1 the cathode 110 may be assembled in the cell devoid of elemental solid sulfur, and the entirety of the sulfur capacity loaded into the cell via the catholyte or solid phase $Li_2S$. Alternatively, the cathode may include some form of solid elemental sulfur, including crystalline sulfur, amorphous sulfur, precipitated sulfur, and sulfur solidified from the melt. Elemental sulfur includes the various polyatomic molecules of sulfur, especially the octasulfur allotrope characterized as cyclo-$S_8$ ring, and polymorphs thereof such as α-octasulfur, β-octasulfur, and γ-octasulfur. For example, elemental sulfur (in the form of sulfur particulates including nano-sized sulfur particles) may be incorporated in the cell as a material component of the cathode, wherein, e.g., the sulfur may be admixed with high surface area or activated carbon particles and an appropriate binder (PTFE, PvDF and PEO) for adhering the material components in a suitable liquid carrier for formulating a slurry to be coated onto or impregnated into the porous matrix structure. Slurry formulations, with or without solid elemental sulfur, and coating methods suitable for use herein for incorporating solid phase active sulfur into the cathode are described in U.S. Pat. Nos. 6,030,720, 6,200,704, and 6,991,662, each of which is hereby fully incorporated by reference for all that they describe, and in particular for the slurry formulations and coating methods described. In the same or separate embodiments the active sulfur in the cathode may be or further include electro-active organosulfur compounds, including those described in U.S. Pat. Nos. 4,833,048; 4,917,974; 5,162,175; 5,516,598, hereby fully incorporated by reference, in particular for their disclosure relating to organosulfur compound composition and use.

In alternative embodiments, the cells may be assembled having all of the sulfur capacity loaded in the cathode, e.g., in the form of elemental sulfur. In other embodiments, sulfur is present in the cathode as a solid phase electroactive material as well as in the aqueous catholyte in the form of dissolved polysulfide species. In some embodiments the cell is assembled using a cathode that is loaded with solid phase $Li_2S$, and by this expedient, the cell may be assembled in the fully or partially discharged state, wherein all or a portion of the active lithium is stored in or nearby the cathode during cell assembly. The as assembled cell is then subsequently charged, e.g., to full charge capacity, prior to initial discharge.

Aqueous Sulfur Catholyte

In accordance with the instant invention, the aqueous catholyte contains a significant amount of water (i.e., not merely a trace amount), and the catholyte is disposed in the cell such that it directly contacts the cathode. In certain embodiments water serves as the main liquid solvent of the sulfur catholyte (i.e., electrolyte in contact with the sulfur cathode), and in particular embodiments water is the only catholyte solvent.

In accordance with the instant invention a significant (non-trace) amount of water is incorporated in the catholyte. In various embodiments the volume percent of water in the catholyte relative to the total liquid solvent volume is greater than 5%, 10%, 20%, 30%, 40%, 50%, 60%, 70%, 80%, and greater than 90%. In certain embodiments water is the only liquid solvent in the catholyte, and in particular embodiments thereof water is the only liquid solvent (i.e., water constitutes 100% of the solvent volume of the catholyte). In various embodiments water is the main solvent in the catholyte.

Water has unique properties. In aqueous sulfur catholyte solutions, water chemically interacts with the active sulfur species to provide a number of benefits. In various embodiments the water serves as a medium into which a large concentration of active sulfur species may be dissolved (e.g., including sulfide anion ($S^{2-}$), polysulfide anion ($S_x^{2-}$ with x>1), hydrosulfide anion ($HS^-$), polyhydrosulfide anion ($HS_x^-$ with x>1) and combinations thereof). In various embodiments, the catholyte composition just prior to initially operating the cell, which is typically the catholyte composition upon cell fabrication and sealing, includes a significant concentration of dissolved active sulfur species. For instance, an active sulfur concentration in the catholyte of greater than 0.5 molar sulfur, greater than 1 molar sulfur, greater than 2 molar sulfur, greater than 3 molar sulfur, greater than 4 molar sulfur, greater than 5 molar sulfur, greater than 6 molar sulfur, greater than 7 molar sulfur, greater than 8 molar sulfur, greater than 9 molar sulfur, greater than 10 molar sulfur, greater than 11 molar sulfur, greater than 12 molar sulfur, greater than 13 molar sulfur, greater than 14 molar sulfur, greater than 15 molar sulfur, greater than 16 molar sulfur or greater than 17 molar sulfur may be used.

Moreover, because it can be difficult to identify the precise chemical nature of the various active sulfur species existing in the catholyte solution at any given time during the course of discharge or charge, the composition of the active species in the catholyte is sometimes expressed herein, and in the claims, in terms of an "active stoichiometric ratio" which is the ratio of active sulfur to active lithium dissolved in the electrolyte, and that ratio is represented by the general formula $Li_2S_x$. Furthermore, it should be understood that the "active stoichiometric ratio" as used herein is exclusive of any non-active lithium salts and/or non-active sulfur salts that may be added to the electrolyte for any purpose, including, e.g., to enhance lithium ion conductivity in the case of e.g., a non-active LiCl salt, or a non-active sulfur containing salt such as, e.g., $LiSO_3CF_3$.

Accordingly, in embodiments, the catholyte, just prior to initially operating the cell, has an active stoichiometric ratio of $Li_2S$, $Li_2S_x$ (x>1), $Li_2S_x$ (1<x<5), $Li_2S_5$, and $Li_2S_x$ (x>5). For example, an active stoichiometric ratio of about $Li_2S$, about $Li_2S_2$, about $Li_2S_3$, about $Li_2S_4$, and about $Li_2S_5$.

In various embodiments, the lithium sulfur cells of the instant invention include an aqueous catholyte having a high concentration of dissolved active sulfur species. In embodiments, the sulfur concentration of active sulfur species in the catholyte is greater than 0.5 molar sulfur, greater than 1 molar sulfur, greater than 2 molar sulfur, greater than 3 molar sulfur, greater than 4 molar sulfur, greater than 5 molar sulfur, greater than 6 molar sulfur, greater than 7 molar sulfur, greater than 8 molar sulfur, greater than 9 molar sulfur, greater than 10 molar sulfur, greater than 11 molar sulfur, greater than 12 molar sulfur, greater than 13 molar sulfur, greater than 14 molar sulfur, greater than 15 molar sulfur, greater than 16 molar sulfur or greater than 17 molar sulfur.

In particular embodiments, the active lithium sulfur stoichiometric ratio in the catholyte just prior to initial cell operation is $Li_2S$; $Li_2S_x$ (x>1); $Li_2S_x$ (1<x<5); $Li_2S_5$; and $Li_2S_x$ (x>5), and the concentration of the dissolved active sulfur species is typically significant, e.g., greater than 1 molar sulfur. For instance, in particular embodiments, especially for cells using a lithium metal or lithium alloy as the electro-active anode material, the active stoichiometric ratio just prior to initial cell operation is $Li_2S_x$ with the following range for x: 2≤x≤5, and the active sulfur concentration is between 10 to 17 molar sulfur. For example, a catholyte composition having an active stoichiometric ratio of about $Li_2S_4$, and at concentrations greater than 10 molar sulfur (e.g., 11, 12, 13, 14, 15, 16 or 17 molar sulfur) may be used. In another particular embodiment, especially useful for cells which are fabricated in the fully or mostly discharged state (e.g., having an anode electroactive material that is devoid of active lithium), the active stoichiometric ratio of the catholyte just prior to initial cell operation is $Li_2S$, and the active sulfur concentration is typically greater than 1 molar sulfur, and preferably greater than 2 molar sulfur, and more preferably greater than 3 molar sulfur (e.g., 3 molar, 4 molar, or 5 molar sulfur).

Of particular note is the high solubility and facile dissolution of $Li_2S$ (lithium sulfide) in water. In non-aqueous aprotic solvents lithium sulfide solubility is severely limited, and $Li_2S$ is generally considered to be insoluble. Water is shown herein to provide an excellent solvent for lithium sulfide ($Li_2S$), and this feature is used for advantage in various embodiments of the instant invention in order to achieve high ampere-hour (Ah) capacity per unit volume of catholyte, and ultimately high cell energy density as well as improved reversibility on deep discharge. A visual comparison is provided in FIG. 5, illustrating that water has at least a 1000 fold greater solubility for $Li_2S$ than that of tetraglyne (a common non-aqueous solvent employed in conventional non-aqueous Li/S cells).

Accordingly, in various embodiments the aqueous catholyte serves as a medium into which high concentrations of $Li_2S$ dissolve. Thus, by this expedient, aqueous lithium sulfur cells yielding a high ampere-hour capacity per unit volume of catholyte can be realized, and these high capacity cells may be deeply discharged repeatedly since the reaction product (e.g., $Li_2S$) is readily dissolved and therefore more readily oxidized on charge. Thus, in various embodiments, at the end of discharge a significant portion of the sulfur ampere-hour capacity is present in the cell in the form of solid phase discharge product (e.g., $Li_2S$). For instance, in embodiments, the end of discharge ratio comparing the number of moles of sulfur as solid phase sulfur (e.g., $Li_2S$) to the number of moles of sulfur dissolved in the catholyte (e.g., as $Li_2S$) is greater than 2; greater than 3; greater than 5, or greater than 10.

Furthermore, the combination of high solubility and fast dissolution kinetics of $Li_2S$ in water also enables a practical method of making an aqueous lithium sulfur cell that is assembled in the fully discharged state, and which makes use of alternative lithium electro-active materials that are different than that of lithium metal, such as carbon intercalation materials, alloys (e.g., of silicon) and combinations thereof such as carbon silicon composites. For example, one method in accordance with the present invention involves: i) providing a carbon anode in the fully discharged state (i.e., entirely un-intercalated); ii) providing an aqueous polysulfide catholyte comprising water and dissolved lithium sulfide; iii) providing a cathode comprising an electron transfer medium for electrochemical oxidation of dissolved lithium sulfide; iv) configuring the anode, catholyte and cathode into a battery cell; and iv) charging the battery cell.

Whereas the fast dissolution kinetics of $Li_2S$ enables repeated deep discharge, additional benefit may be gained by taking advantage of the facile electro-kinetics of solution phase redox in combination with the high solubility of polysulfide species in water. Thus, in various embodiments, the cell is formulated such that at full state of charge the catholyte contains a high concentration of dissolved active sulfur species, and in certain embodiments the cell is formulated and operated such that the ampere-hour capacity of sulfur in the cell at full state of charge is solely present as dissolved species in the catholyte.

Without intending to be limited by theory, lithium sulfide dissolution in water involves hydrolysis that is believed to take place in accordance with the following equilibrium:

$$S^{2-}+HOH \leftrightarrow HS^-+OH^-$$

Thus the pH of highly concentrated aqueous catholyte solutions of $Li_2S$ dissolved in water is generally quite high and typically greater than pH 10, and more typically greater than pH 11 or even higher, e.g., about pH 12, about pH 13, or about pH 14. However, the invention is not exclusively limited to cells having an aqueous sulfur catholyte of such high pH, as the pH may be tailored using pH adjusting additives, including basic salts (e.g., LiOH), acidic salts (e.g., HCl) and buffering agents as are known to those of skill in the art. Thus, in various embodiments the catholyte may be formulated having a pH that renders it acidic (i.e., pH<7), basic (i.e., pH>7), or neutral (pH about 7).

The aqueous catholyte may further comprise a supporting lithium salt to maintain a consistent and high conductivity over the entire discharge and/or improve stability. Typically the supporting salt concentration is in the range of 0.05 to 1.5 moles/liter (e.g., about 0.25 moles/liter). Examples of suitable supporting salts include a variety of lithium cation salts. For instance, lithium halides (e.g., LiCl, LiBr), $LiSO_3CF_3$, $LiN(CF_3SO_2)_2$ and $LiN(SO_2C_2F_5)_2$. Typically present in the catholyte to a concentration of about 0.05 to 1.5 molar lithium, e.g., 0.1, 0.2, 0.3, 0.4, 0.5, 0.6, 0.7, 0.8, 0.9, or 1.0 molar lithium.

Electro-active aqueous catholytes in accordance with the instant invention comprise water and an active sulfur species dissolved therein. In various embodiments the active sulfur species are formed in the catholyte by reacting one or more precursor materials with each other and/or with water. In one embodiment a first precursor of lithium sulfide and a second precursor of elemental sulfur are reacted in stoichiometric amounts in the presence of water to yield active sulfur species in solution. Preferably, to mitigate the undesirable formation of insoluble products of oxidation (e.g., thiosulfates), the water should be deoxygenated (i.e., the water should be substantially devoid of molecular oxygen), which may be carried out by any suitable method known in the art, including boiling of the water and/or purging the water with an oxygen free gas, such as nitrogen. The purging step continued until the desired level of oxygen has been reached. For instance, the concentration of molecular oxygen in the catholyte is preferably less than 1000 ppm, and more preferably less than 500 ppm and even more preferably less than 100 ppm, or less than 50 ppm or even 10 ppm.

In various embodiments the aqueous catholyte further comprises one or more non-aqueous solvents. In various embodiments the volume percent of non-aqueous solvents in the catholyte ranges from about 1% to as much as 90% by volume; for example, between 1% and 10%, between 10% and 20%, between 20% and 30%, between 30% and 40%, between 40% and 50%, between 50% and 60%, between 60% and 70%, between 70% and 80%, between 80% and 90%.

Non-aqueous solvents suitable for use herein to improve performance include aprotic and protic organic solvents (solids and liquids, typically liquids or solid polyethylene oxide) and ionic liquids. In particular, in some embodiments protic organic solvents may be used.

Examples of suitable non-aqueous aprotic and protic solvents include ethers (e.g., 2-Methyltetrahydrofuran (2-MeTHF), Tetrahydrofuran (THF), 4-Methyldioxolane (4-MeDIOX), Tetrahydropyran (THP) and 1,3-Dioxolane (DIOX)) glymes (e.g., 1,2-dimethoxyethane (DME/monoglyme), di-glyme, tri-glyme, tetra-glyme and higher glymes), carbonates (e.g., cyclic carbonates such as propylene carbonate (PC), ethylene carbonate (EC), acyclic carbonates such as dimethyl carbonate (DMC), ethylmethyl carbonate (EMC) and diethyl carbonate (DEC), formates (e.g., Methyl Formate) and butyrolactone (GBL). Other suitable aprotic solvents include those having a high donor number (i.e., donor solvents) such as hexamethylphosphoramide, pyridine, N,N-diethylacetamide (DMAC), N,N-diethylformamide, dimethylsulfoxide (DMSO), tetramethylurea (TMU), N,N-dimethylacetamide, N,N-dimethylformamide (DMF), tributylphosphate, trimethylphosphate, N,N,N',N'-tetraethylsulfamide, tetraethylenediamine, tetramethylpropylenediamine, and pentamethyldiethylenetriamine. Preferred donor solvents have a donor number of at least 15, more preferably between about 15 and 40 and most preferably between about 18-40. Particularly preferred donor solvents include N,N-diethylformamide, N,N-dimethylformamide (DMF), dimethylsulfoxide (DMSO), N,N-dimethylacetamide (DMAC); for example, DMF. Suitable acceptor solvents which can be characterized as Lewis acids (they may be protic or aprotic solvents) and promote solvation of anions. Examples include alcohols such as methanol, glycols such as ethylene glycol and polyglycols such as polyethylene glycol as well as nitromethane, trifluoroacetic acide, trifluoromethanesulfonic acid, sulfur dioxide and boron triflouride, and ethylene glycol (EG). Others include nitriles (e.g., acetonitrile (AN), higher nitriles, propionitrile, succinonitrile, butyronitrile, benzonitrile), amides (e.g., formamide, N-methylformamide, N,N-dimethylformamide, N,N-diethylformamide, (DMF), acetamide, N-methylacetamide, N,N-dimethylacetamide (DMAC), N,N-diethylacetamide, N,N,N'N' tetraethylsulfamide, tetramethylurea (TMU), 2-pyrrolidone, N-methylpyrrolidone, N-methylpyrrolidinone), amines (e.g., butylamine, ethylenediamine, triethylamine, pyridine, 1,1,3,3-tetramethylguanidine (TMG), tetraethylenediamine, tetramethylpropylenediamine, pentamethyldiethylenetriamine, organosulfur solvents (e.g., dimethylsulfoxide (DMSO), sulfolane, other sulfones, dimethylsulfite, ethylene sulfite, and organophosphorous solvents (e.g., tributylphosphate, trimethylphosphate, hexamethylphosphoramide (HMPA)).

In the same or separate embodiments a non-aqueous solvent may be added to the aqueous catholyte to effect dissolution of elemental sulfur. The addition of such a solvent (e.g., toluene or carbon disulfide, preferably toluene) can enable charging to elemental sulfur (dissolved or precipitated).

While the use of non-aqueous solvents such as aprotic organic solvents, typically liquids, but not limited as such, may be useful for facilitating the dissolution of high order polysulfide species, protic solvents and ionic liquids may also be incorporated in the aqueous catholyte to further enhance dissolution of lithium sulfide or more generally improve cell performance.

For instance, in particular embodiments the aqueous catholyte comprises water and a protic solvent that is non-aqueous, especially protic organic solvents that are capable of dissolving a significant amount of $Li_2S$. Particularly suitable non-aqueous protic solvents are organic solvents such as alcohols, diols, triols and polyols, especially alcohols (e.g., methanol and ethanol) and diols (e.g., ethylene glycol). Addition of the non-aqueous protic solvent is particularly useful in cells that may be operated at temperatures below the freezing temperature of water and yet still require high solubility for lithium sulfide. Accordingly, in various embodiments the catholyte is formulated with an amount of a non-aqueous protic solvent to achieve a desired freezing point temperature (i.e., melt temperature), including formulations wherein the melt temperature is less than 0° C., less than –5° C., less than –10° C., less than –15° C., less than –20° C., less than –30° C., and less than –40° C. Moreover, it is contemplated herein that the non-aqueous protic solvent may be present in high concentration in the catholyte, including 10%-20%, 20%-30%, 30%-40%, 40%-50%, 50%-60%, 60%-70%, 70%-80%, 80%-90% (e.g., such said volume percents of methanol, ethanol or ethylene glycol or combinations thereof.

Contact between the aqueous electrolyte and the cathode electron transfer medium, for example an electronically conductive matrix such as a carbon or metal mesh, foam or other high surface area, typically porous, structure, may be enhanced by electrolyte additives and/or co-solvents. Such improved contact enhances utilization and rate performance of the cell. Electrolyte/catholyte compositions in this regard can include a surfactant, such as a polyol or polyglycol, for example PEG, to wet the catholyte to the conductive matrix. Also or alternatively, the matrix can be surface treated prior to contact with the electrolyte to enhance wetting, for example being soaked in a wetting agent, such as methanol or ethylene glycol, followed by displacement of the wetting agent with the aqueous catholyte solution of polysulfides. Still further in this regard, the catholyte may include dissolved organosulfur as a cathode active material. The organosulfur compound or compounds can self-wet to the cathode electron transfer matrix.

Lithium Anode

Typically, when using a protected lithium electrode as described below in which a solid electrolyte membrane provides isolation of the electro-active material against contact with the aqueous catholyte, the catholyte is devoid of certain extraneous ions which would otherwise interfere with the cell functionality, including contaminating the membrane via diffusion into the conductive atomically formed channels. Accordingly, in various embodiments of the instant invention the aqueous catholyte is substantially devoid of alkali metal cations other than lithium, and more preferably substantially devoid of all metal cations other than lithium. For example the catholyte is devoid of sodium and potassium ions, which is to mean that there is substantially no sodium or potassium ions in the electrolyte.

The cell comprises a Li anode. The lithium electroactive material of the anode is typically in layered form and may be Li metal or a Li metal alloy (e.g., silicon) or Li intercalation material (e.g., lithiated carbon) or in a particular embodiment a silicon carbon composite. In one example, a Li metal foil may be used. In another example lithium ion anodes, which are well known in the battery art, are used as the electro-active lithium material layer (e.g., a carbon intercalation material coated on a copper current collector). Electro-active lithium materials, including intercalation host compounds and lithium alloys and lithium metal are well known in the lithium battery art. In certain embodiments the anode is lithium metal (e.g., in foil or sintered form) and of sufficient thickness (i.e., capacity) to enable the cell to achieve the rated discharge capacity of the cell. The anode may take on any suitable form or construct including a green or sintered compact (such as a wafer or pellet), a sheet, film, or foil, and the anode may be porous or dense. Without limitation, the lithium anode may have a current collector (e.g., copper foil, or suitable expandable metal) pressed or otherwise attached to it in order to enhance the passage of electrons between it and the leads of the cell. Without limitation the cell may be anode or cathode limited. When anode limited, the complete discharge (corresponding to rated capacity) will substantially exhaust all the lithium in the anode. When cathode limited, some active lithium will remain subsequent to the cell delivering its rated capacity.

The anode is protected with a protective membrane architecture chemically stable to both the anode and the environment of the adjacent sulfur cathode. The protective membrane architecture typically comprises a solid electrolyte protective membrane and an interlayer. The solid electrolyte protective membrane is sometimes referred to herein as ion membrane. The protective membrane architecture is in ionic continuity with the Li anode and is configured to selectively transport Li ions while providing an impervious barrier to the environment external to the anode. Protective membrane architectures suitable for use in the present invention are described in applicants' U.S. Pat. Nos. 7,645,543; 7,666,233; 8,048,571; and 7,282,295, incorporated by reference herein in their entirely, and in particular for their description of protective membrane structures and architectures.

FIGS. 5A-D illustrate representative protective membrane architectures from these disclosures suitable for use in the present invention. The protective membrane architectures provide a barrier to isolate a Li anode from ambient and/or the cathode side of the cell while allowing for efficient ion Li metal ion transport into and out of the anode. The architecture may take on several forms. Generally it comprises a solid electrolyte layer that is substantially impervious, ionically conductive and chemically compatible with the external ambient (e.g., air or water) or the cathode environment.

Figure 5A:
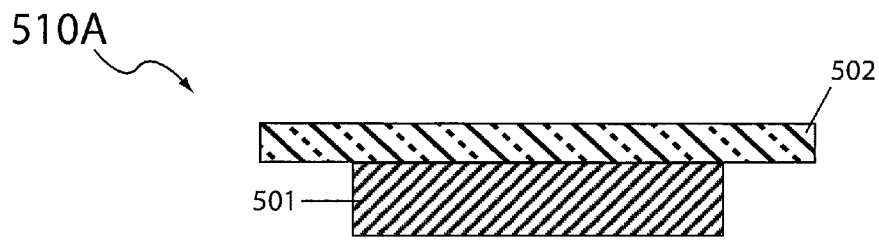
FIGS. 5A-D illustrate various alternative configurations of a protective membrane architecture in accordance with the present invention.

Referring to FIG. 5A, the protective membrane architecture can be a monolithic solid electrolyte 502 that provides ionic transport and is chemically stable to both the active metal anode 501 and the external environment. Examples of such materials are $LiHfPO_4$, LISICON (the lithium-stable analog to NASICON), $Li_5La_3Ta_2O_{12}$ and $Li_5La_3Nb_2O_{12}$, $Na_5MSi_4O_{12}$ (M: rare earth such as Nd, Dy, Gd) and the garnet-like structures described below.

More commonly, the ion membrane architecture is a composite composed of at least two components of different materials having different chemical compatibility requirements, one chemically compatible with the anode, the other chemically compatible with the exterior; generally ambient air or water, and/or battery electrolytes/catholytes. By "chemical compatibility" (or "chemically compatible") it is meant that the referenced material does not react to form a product that is deleterious to battery cell operation when contacted with one or more other referenced battery cell components or manufacturing, handling, storage or external environmental conditions. The properties of different ionic conductors are combined in a composite material that has the desired properties of high overall ionic conductivity and chemical stability towards the anode, the cathode and ambient conditions encountered in battery manufacturing. The composite is capable of protecting an active metal anode from deleterious reaction with other battery components or ambient conditions while providing a high level of ionic conductivity to facilitate manufacture and/or enhance performance of a battery cell in which the composite is incorporated.

Figure 5B:
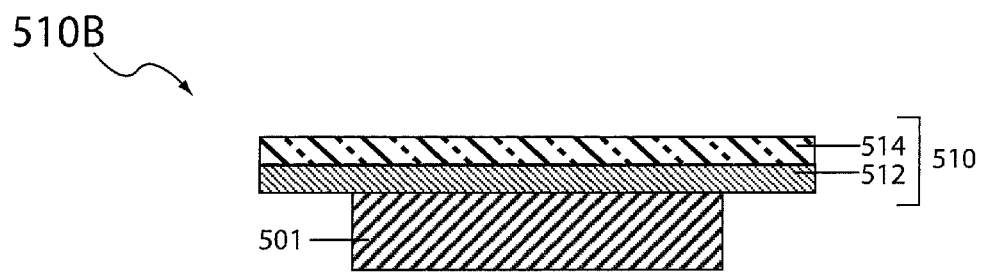
Figure 5C:
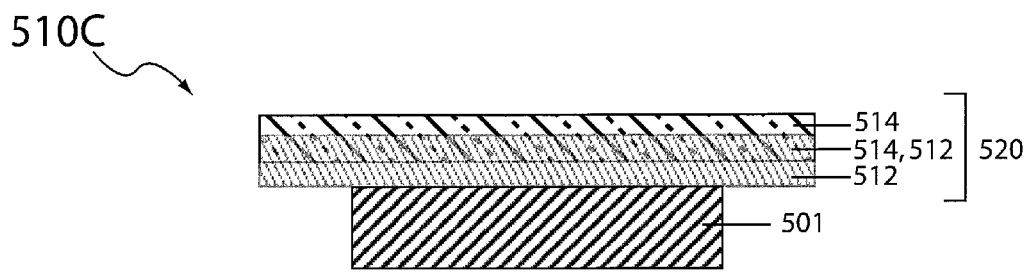

Referring to FIG. 5B, the protective membrane architecture can be a composite solid electrolyte 510 composed of discrete layers, whereby the first material layer 512 (also sometimes referred to herein as "interlayer") is stable to the active metal anode 501 and the second material layer 514 is stable to the external environment. Alternatively, referring to FIG. 5C, the protective membrane architecture can be a composite solid electrolyte 520 composed of the same materials, but with a graded transition between the materials rather than discrete layers.

Generally, the solid state composite protective membrane architectures (described with reference to FIGS. 5B and C have a first and second material layer. The first material layer (or first layer material) of the composite is ionically conductive, and chemically compatible with an active metal electrode material. Chemical compatibility in this aspect of the invention refers both to a material that is chemically stable and therefore substantially unreactive when contacted with an active metal electrode material. It may also refer to a material that is chemically stable with air, to facilitate storage and handling, and reactive when contacted with an active metal electrode material to produce a product in-situ that is chemically stable against the active metal electrode material and has the desirable ionic conductivity (i.e., a first layer material). Such a reactive material is sometimes referred to as a "precursor" material. The second material layer of the composite is substantially impervious, ionically conductive and chemically compatible with the first material. Additional layers are possible to achieve these aims, or otherwise enhance electrode stability or performance. All layers of the composite have high ionic conductivity, at least $10^{-7}$ S/cm, generally at least $10^{-6}$ S/cm, for example at least $10^{-5}$ S/cm to $10^{-4}$ S/cm, and as high as $10^{-3}$ S/cm or higher so that the overall ionic conductivity of the multi-layer protective structure is at least $10^{-7}$ S/cm and as high as $10^{-3}$ S/cm or higher.

Figure 5D:
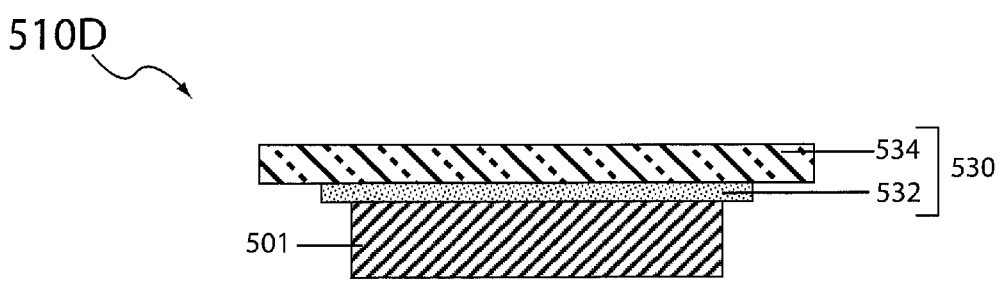

A fourth suitable protective membrane architecture is illustrated in FIG. 5D. This architecture is a composite 530 composed of an interlayer 532 between the solid electrolyte 534 and the active metal anode 501 whereby the interlayer is includes a non-aqueous liquid, gel or solid polymer electrolyte polymer phase anolyte. Thus, the architecture includes an active metal ion conducting separator layer with a non-aqueous anolyte (i.e., electrolyte in contact with the anode electroactive material), the separator layer being chemically compatible with the active metal and in contact with the anode; and a solid electrolyte layer that is substantially impervious (pinhole- and crack-free) ionically conductive layer chemically compatible with the separator layer and aqueous environments and in contact with the separator layer. The solid electrolyte layer of this architecture (FIG. 5D) generally shares the properties of the second material layer for the composite solid state architectures (FIGS. 5B and C). Accordingly, the solid electrolyte layer of all three of these architectures will be referred to below as a second material layer or second layer.

A wide variety of materials may be used in fabricating protective composites in accordance with the present invention, consistent with the principles described above. For example, in the solid state embodiments of FIGS. 5B and 5C, the first layer (material component), in contact with the active metal, may be composed, in whole or in part, of active metal nitrides, active metal phosphides, active metal halides active metal sulfides, active metal phosphorous sulfides, or active metal phosphorus oxynitride-based glass. Specific examples include $Li_3N$, $Li_3P$, LiI, LiBr, LiCl, LiF, $Li_2S$—$P_2S_5$, $Li_2S$—$P_2S_5$—LiI and LiPON. Active metal electrode materials (e.g., lithium) may be applied to these materials, or they may be formed as reaction products in situ by contacting precursors such as metal nitrides, metal phosphides, metal halides, red phosphorus, iodine, nitrogen or phosphorus containing organics and polymers, and the like with lithium. A particularly suitable precursor material is copper nitride (e.g., $Cu_3N$). The in situ formation of the first layer may result from an incomplete conversion of the precursors to their lithiated analog. Nevertheless, such composite reaction products formed by incomplete conversions meet the requirements of a first layer material for a protective composite in accordance with the present invention and are therefore within the scope of the invention.

For the anolyte interlayer composite protective architecture embodiment (FIG. 5D), the protective membrane architecture has an active metal ion conducting separator layer chemically compatible with the active metal of the anode and in contact with the anode, the separator layer comprising a non-aqueous anolyte, and a substantially impervious, ionically conductive layer ("second" layer) in contact with the separator layer, and chemically compatible with the separator layer and with the exterior of the anode. The separator layer can be composed of a semi-permeable membrane impregnated with an organic anolyte. For example, the semi-permeable membrane may be a micro-porous polymer, such as are available from Celgard, Inc. The organic anolyte may be in the liquid or gel phase. For example, the anolyte may include a solvent selected from the group consisting of organic carbonates, ethers, lactones, sulfones, etc., and combinations thereof, such as EC, PC, DEC, DMC, EMC, 1,2-DME or higher glymes, THF, 2MeTHF, sulfolane, and combinations thereof. 1,3-dioxolane may also be used as an anolyte solvent, particularly but not necessarily when used to enhance the safety of a cell incorporating the structure. When the anolyte is in the gel phase, gelling agents such as polyvinylidine fluoride (PVdF) compounds, hexafluoropropylene-vinylidene fluoride copolymers (PVdf-HFP), polyacrylonitrile compounds, cross-linked polyether compounds, polyalkylene oxide compounds, polyethylene oxide compounds, and combinations and the like may be added to gel the solvents. Suitable anolytes will, of course, also include active metal salts, such as, in the case of lithium, for example, $LiPF_6$, $LiBF_4$, $LiAsF_6$, $LiSO_3CF_3$ or $LiN(SO_2C_2F_5)_2$. One example of a suitable separator layer is 1 M $LiPF_6$ dissolved in propylene carbonate and impregnated in a Celgard microporous polymer membrane.

The second layer (material component) of the protective composite may be composed of a material that is substantially impervious, ionically conductive and chemically compatible with the first material or precursor, including glassy or amorphous metal ion conductors, such as a phosphorus-based glass, oxide-based glass, phosphorus-oxynitride-based glass, sulpher-based glass, oxide/sulfide based glass, selenide based glass, gallium based glass, germanium-based glass, Nasi-glass; ceramic active metal ion conductors, such as lithium beta-alumina, sodium beta-alumina, Li superionic conductor (LISICON), and the like; or glass-ceramic active metal ion conductors. Specific examples include LiPON, $Li_3PO_4.Li_2S.SiS_2$, $Li_2S.GeS_2.Ga_2S_3$, $Li_2O.11Al_2O_3$, $Na_2O.11Al_2O_3$, $Li_{1+x}Ti_{2-x}Al_x(PO_4)_3$ (0.1≤x≤0.9) and crystallographically related structures, $Li_{1+x}Hf_{2-x}Al_x(PO_4)_3$ (0.1≤x≤0.9), $Li_3Zr_2Si_2PO_{12}$, $Na_5ZrP_3O_{12}$, Li-Silicates, $Li_{0.3}La_{0.5}TiO_3$, $Li_5MSi_4O_{12}$ (M: rare earth such as Nd, Gd, Dy) $Li_5ZrP_3O_{12}$, $Li_5TiP_3O_{12}$, $Li_3Fe_2P_3O_{12}$ and $Li_4NbP_3O_{12}$, and combinations thereof, optionally sintered or melted. Suitable ceramic ion active metal ion conductors are described, for example, in U.S. Pat. No. 4,985,317 to Adachi et al., incorporated by reference herein in its entirety and for all purposes.

A particularly suitable glass-ceramic material for the second layer of the protective composite is a lithium ion conductive glass-ceramic having the following composition:

| Composition | mol % |
|---|---|
| $P_2O_5$ | 26-55% |
| $SiO_2$ | 0-15% |
| $GeO_2 + TiO_2$ | 25-50% |
| in which $GeO_2$ | 0-50% |
| $TiO_2$ | 0-50% |
| $ZrO_2$ | 0-10% |
| $M_2O_3$ | 0-10% |
| $Al_2O_3$ | 0-15% |
| $Ga_2O_3$ | 0-15% |
| $Li_2O$ | 3-25% | and containing a predominant crystalline phase composed of $Li_{1+x}(M,Al,Ga)_x(Ge_{1-y}Ti_y)_{2-x}(PO_4)_3$ where X≤0.8 and 0≤Y≤1.0, and where M is an element selected from the group consisting of Nd, Sm, Eu, Gd, Tb, Dy, Ho, Er, Tm and Yb and/or $Li_{1+x+y}Q_xTi_{2-x}Si_yP_{3-y}O_{12}$ where 0<X≤0.4 and 0<Y≤0.6, and where Q is Al or Ga. The glass-ceramics are obtained by melting raw materials to a melt, casting the melt to a glass and subjecting the glass to a heat treatment. Such materials are available from OHARA Corporation, Japan and are further described in U.S. Pat. Nos. 5,702,995, 6,030,909, 6,315,881 and 6,485,622, incorporated herein by reference.

Another particularly suitable material for the second layer of the protective composite is a lithium ion conducting oxide having a garnet like structure. These include $Li_6BaLa_2Ta_2O_{12}$; $Li_7La_3Zr_2O_{12}$, $Li_5La_3Nb_2O_{12}$, $Li_5La_3M_2O_{12}$, (M=Nb, Ta)$Li_{7+x}A_xLa_{3-x}Zr_2O_{12}$ where A may be Zn. These materials and methods for making them are described in U.S. Patent Application Pub. No. 2007/0148533 (application Ser. No. 10/591,714), hereby incorporated by reference in its entirety, and suitable garnet like structures are also described in International Patent Application Pub. No. WO/2009/003695 which is hereby incorporated by reference for all that it contains, and in particular for its description of garnet-like structures.

The composite should have an inherently high ionic conductivity. In general, the ionic conductivity of the composite is at least $10^{-7}$ S/cm, generally at least about $10^{-6}$ to $10^{-5}$ S/cm, and may be as high as $10^{-4}$ to $10^{-3}$ S/cm or higher. The thickness of the first precursor material layer should be enough to prevent contact between the second material layer and adjacent materials or layers, in particular, the active metal of the anode. For example, the first material layer for the solid state membranes can have a thickness of about 0.1 to 5 microns; 0.2 to 1 micron; or about 0.25 micron. Suitable thickness for the anolyte interlayer of the fourth embodiment range from 5 microns to 50 microns, for example a typical thickness of Celgard is 25 microns.

The thickness of the second material layer is preferably about 0.1 to 1000 microns, or, where the ionic conductivity of the second material layer is about $10^{-7}$ S/cm, about 0.25 to 1 micron, or, where the ionic conductivity of the second material layer is between about $10^{-4}$ about $10^{-3}$ S/cm, about 10 to 1000 microns, preferably between 1 and 500 microns, and more preferably between 10 and 100 microns, for example about 20 microns.

Seals and methods of making seals which are particularly suitable for sealing protected anodes described hereinabove and elsewhere, including compliant and rigid seals, are fully described in US Patent Publication No. 2007/0037058 and US Patent Publication No. US 2007/0051620 to Visco et al., and are hereby incorporated by reference in their entirety, and in particular for their descriptions of cell seals and sealing techniques.

Optional Separator

With reference to FIG. 1 an optional separator component 130 may be interposed between the membrane architecture and the sulfur cathode. Various separator materials suitable for use herein are known in the battery arts. These separators include porous inorganic mats, microporous polymer sheets, and gels. In a particular embodiment the separator is a hydrogel comprising water impregnated a polymer. In some embodiments the polymer itself may also serve as a solid solvent for the dissolution of active sulfur species, such as PEO and polyalcohols (e.g., polyvinyl alcohol).

In various embodiments the instant battery cell is fabricated such that the entirety of the cathode capacity is loaded into the cell upon fabrication as dissolved polysulfide species (e.g., the active stoichiometric ratio of $Li_2Sx$ with x is >1 e.g., about $Li_2S_2$, about $Li_2S_3$, about $Li_2S_4$, and about $Li_2S_5$). In certain embodiments solid phase sulfur is added to further enhance cell capacity (i.e., the cathode active species derived from a combination of dissolved polysulfide species and solid elemental sulfur. In some embodiments the entirety of the cathode active sulfur is loaded into the cathode as solid elemental sulfur. While in other embodiments, as described herein, the catholyte is in a fully reduced state composed of $Li_2S$ dissolved in water, and in some embodiments thereof solid phase $Li_2S$ may be dispersed in the catholyte or present as a solid particle in the pores of the cathode or separator.

In accordance with various embodiments of the instant invention a significant amount of the cathode ampere-hour capacity is derived from the active aqueous sulfur catholyte, and that amount is typically greater than 10%; for instance, greater than 20%, greater than 30%, greater than 40%, greater than 50%, greater than 60%, greater than 70%, greater than 80%, greater than 90%, and in certain embodiments 100%.

Flow Cells

Figure 6:
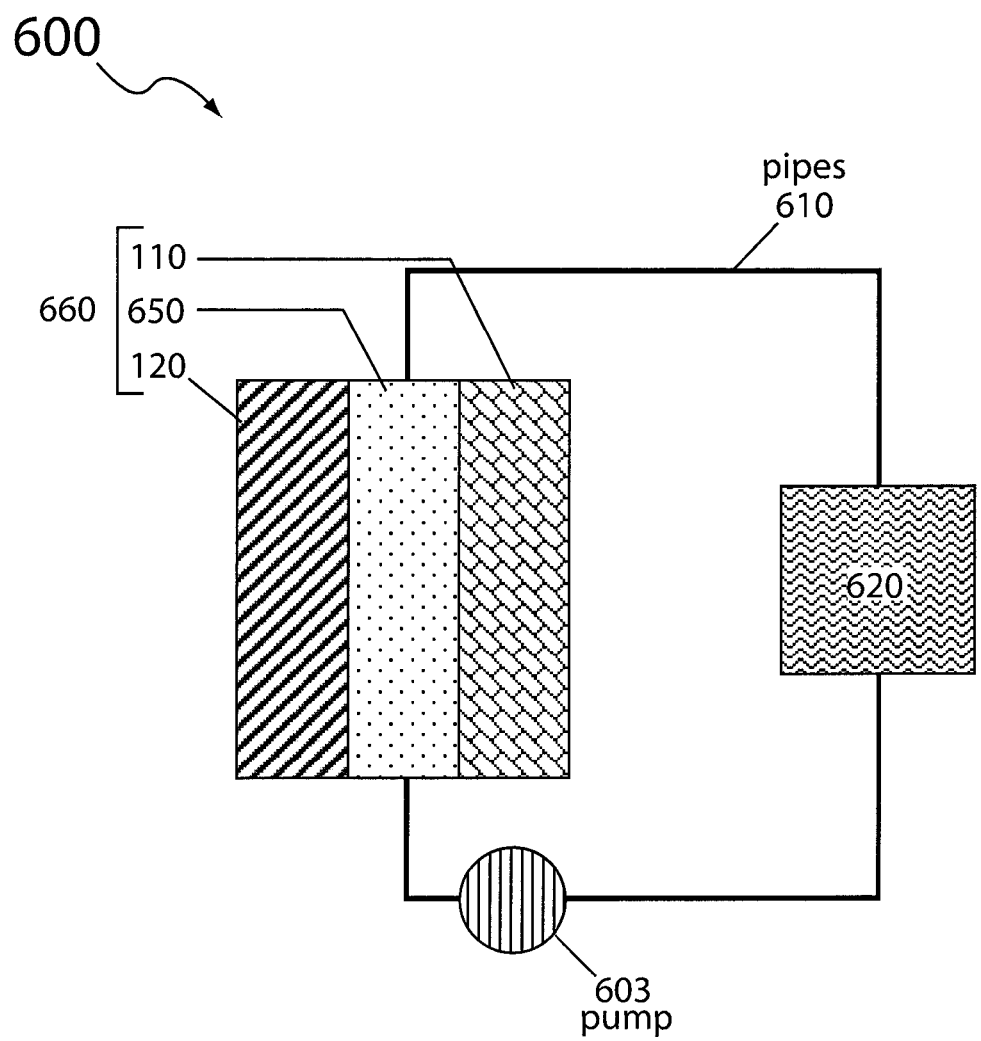
FIG. 6 is a schematic cross section of a battery flow cell system in accordance with an embodiment of the present invention.

With reference to FIG. 6 there is illustrated a representative embodiment of an aqueous lithium sulfur flow cell battery system 600 in accordance with the instant invention. The system includes a reactor cell 660 in which there is positioned a lithium anode 120 and a sulfur cathode 110 configured, in one embodiment, in a spatially apart relationship, therewith defining an inter-electrode region 650 through which an aqueous sulfur catholyte is caused to flow during operation. In various embodiments the lithium anode is a protected lithium electrode as described above and the sulfur cathode likewise as described above. In a slightly modified embodiment the sulfur cathode, a porous three dimensional body, is positioned in direct contact with the first surface of the protected anode solid electrolyte membrane architecture (i.e., not in a spatially apart relationship) and the aqueous catholyte is caused to flow into the pores of the cathode structure.

Continuing with reference to FIG. 6 the system further comprises an external reservoir system, which may take the form of a storage tank 620 for storing the aqueous sulfur catholyte to be flowed through the inter-electrode region or channel. The reservoir system may also include pipeworks 610 for fluidly coupling the tank to the reactor, and a pump 603 for circulating the electrolyte through the channel. The pipeworks may have valves (not shown) for closing or opening the reactor cell to the storage tank. The pump may be operated for circulating the electrolyte through the channel, and the valves may be used to control the flow of catholyte through the reactor.

The aqueous catholyte provides the electroactive sulfur species, which are electrochemically reacted at the sulfur electrode during charge and discharge. In operation, the aqueous catholyte from the storage tank is caused to flow by or through the sulfur cathode, and dissolved polysulfide species are electro-reduced when the system is delivering electricity (during discharge) and electro-oxidized when storing electricity on charge.

Since the ampere-hour capacity of the cathode is provided by the aqueous catholyte in the storage tank, the sulfur cathode is typically assembled in the reactor cell devoid of elemental sulfur. For instance, the sulfur cathode may be a carbon matrix optionally coated with a catalyst to facilitate polysulfide redox while inhibiting hydrogen evolution. Moreover, during system assembly, while the lithium electro-active material of the anode may be incorporated in a fully charged state (e.g., in the form of a lithium metal foil), in preferred embodiments it is an intercalation material or alloy material that is incorporated in the fully discharged state (i.e., devoid of any active lithium). Carbon materials such as graphitic carbons capable of reversibly intercalating lithium are a particularly suitable lithium electroactive material for use in the instant flow cell system. Others include lithium alloying materials, as described above, such as silicon and tin which are capable of reversibly absorbing/desorbing lithium electrochemically, as well as composite carbon silicon materials.

Held in the storage tank, the aqueous catholyte effectively provides the cathode fuel for the electrochemical reaction at the sulfur cathode, and the aqueous catholytes embodiments described above with reference to the battery cell embodiment illustrated in FIG. 1 are suitable for use herein as a cathode fuel. The aqueous catholyte fuel comprises polysulfide species dissolved in water. In embodiments the concentration of the dissolved polysulfide species in the electrolyte is in the range of 0.5 to 1 molar sulfur, 1 to 2 molar sulfur, 2 to 3 molar sulfur, 3 to 4 molar sulfur, 4 to 5 molar sulfur, 5 to 6 molar sulfur, 6 to 7 molar sulfur, 7 to 8 molar sulfur, 8 to 9 molar sulfur, 9 to 10 molar sulfur, and in some embodiments the concentration of polysulfide species is greater than 10 molar sulfur, greater than 11 molar, greater than 12 molar, greater than 13 molar, greater than 14 molar, greater than 15 molar, and greater than 16 molar.

In one embodiment the system is assembled with the lithium electro-active material in the discharged state (e.g., carbon intercalation material devoid of intercalated lithium), and the aqueous catholyte comprising highly reduced polysulfide species, e.g., dissolved $Li_2S$. For example, the aqueous catholyte a solution of about 3 molar $Li_2S$ dissolved in water. Aqueous sulfur catholyte storage tanks having enhanced sulfur capacity (i.e., greater sulfur capacity per unit volume) may be achieved by adding additional solid lithium sulfide to the catholyte beyond its solubility limit (i.e., a saturated water solution of $Li_2S$). Because of the fast kinetics of lithium sulfide dissolution in water, additional catholyte capacity may be added to the tank by dispersing or suspending solid phase lithium sulfide in the aqueous catholyte.

Continuing with reference to the above embodiment, the system is assembled in the fully discharged state so it must undergo an initial charge reaction to lithiate the carbon intercalation material. The initial charge may be conducted via electro-oxidation of the reduced aqueous catholyte (e.g., 3 molar $Li_2S$ water solution) or a conditioning catholyte formulation may be used, for instance one in which sulfur is not the electro-active species. For example, the initial charge may be completed by using a water based lithium nitrate catholyte solution that is circulated or caused to flow past the cathode, whereupon the water is electro-oxidized and oxygen evolved, while at the anode lithium ions from the conditioning catholyte electro-reductively intercalate into the carbon. The conditioning catholyte flowing through the channel may be electro-oxidized until the reaction is complete and the carbon is sufficiently or fully lithiated. Thereafter, the conditioning catholyte tank is replaced by a tank of aqueous sulfur catholyte.

In embodiments wherein the lithium electroactive material is fully or mostly charged via the lithiation step described above (e.g., by using a conditioning catholyte), the aqueous catholyte may then be formulated in a highly oxidative state; for instance, as elemental sulfur dispersed or suspended in a water solution typically also comprising a dissolved lithium salt (e.g., lithium hydroxide) to support the ionic current. It is contemplated that toluene may be added to the catholyte in order to dissolved some of the dispersed solid sulfur and by this expedient facilitate electro-reduction at the sulfur cathode.

Various compositions of the as formulated catholyte storage tanks are contemplated. In various embodiments the flow cell is operated such that the active stoichiometric lithium sulfur ratio is $Li_2S_x$ with (1<x<5), (x=5), or (x>5)

In the aforementioned flow cell embodiments, the lithium electroactive material is stationary, which is to mean that it is non-flowing and incorporated as a component of the protected lithium electrode, e.g., typically in the form of a layer such as a sintered layer or a coating on a current collector as is well known in the field of lithium ion batteries. Thus, the capacity of the anode is set once the coating is formed and the system is assembled.

Figure 7:
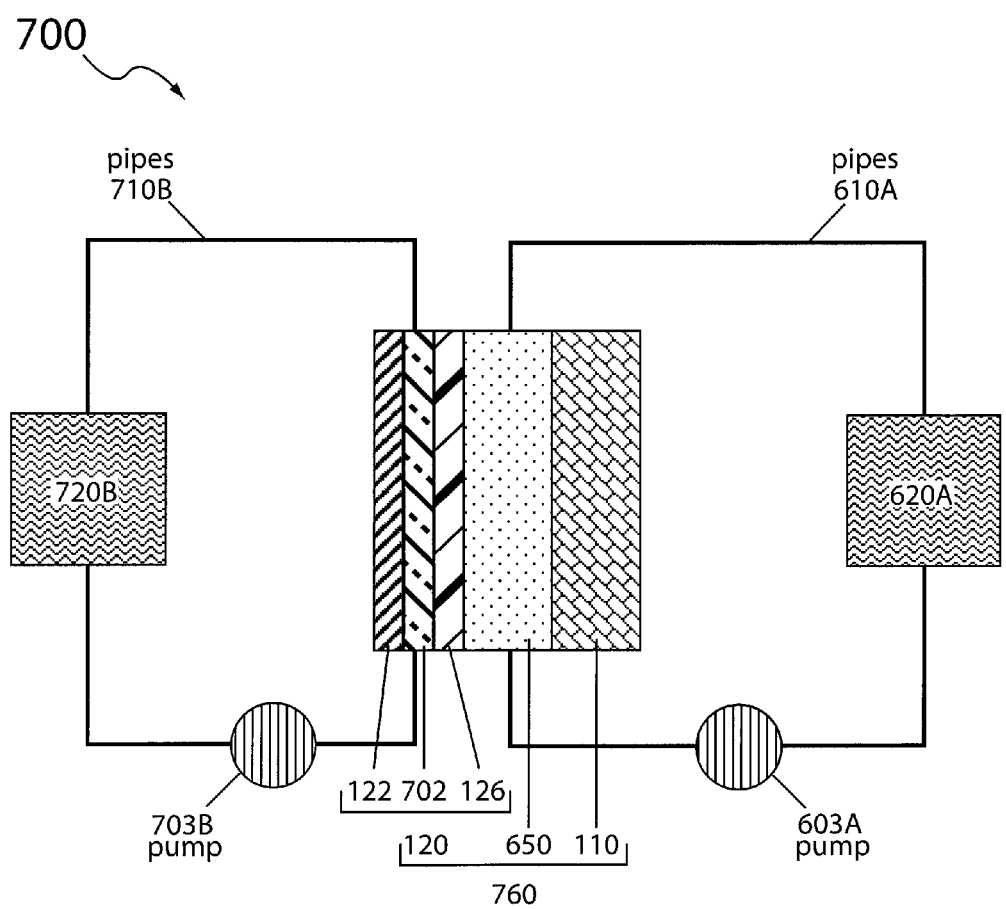
FIG. 7 is a schematic cross section of a battery flow cell system in accordance with an alternative embodiment of the present invention.

In an alternative embodiment, with reference to the flow cell system 700 illustrated in FIG. 7, the structure of FIG. 6 is supplemented by a reactor cell 760 configured for through flow of a flowable lithium electroactive material (e.g., an electro-active lithium slurry) between an anode current collector 122 on which the electrochemical reactions take place and the second surface of a substantially impervious lithium ion conducting membrane architecture 126. Flowable lithium electroactive materials suitable for use herein are described in US Patent Application Pub. Nos. 2011/0200848 of Chiang et al., published Aug. 18, 2011 and 2010/0323264 of Chiang et al., published Dec. 23, 2011, and each of these is hereby incorporated by reference for all that they contain in this regard. Generally these are anode particles dispersed in an ionically conductive carrier fluid that is compatible with the anode particles over the range of oxidation state encompassing full charge to full discharge. Particularly suitable anode particulates are intercalation carbons or alloy materials such as silicon, or a combination of these (e.g., carbon-silicon composite). The anode current collector 122 is disposed in the cell in spaced relation to the protective membrane architecture, thus defining a channel 702 through which the lithium electro-active slurry is caused to flow, for instance via pumping action. The flow system includes a second external reservoir system for the lithium anode, which may take the form of a storage tank 720B for storing the lithium anode slurry and pipeworks 710B for fluidly coupling the tank to the reactor cell, and a pump 703B for circulating the slurry through the channel, similar to that which is described above for circulating the sulfur catholyte.

CONCLUSION

Various embodiments of the invention have been described. However a person of ordinary skill in the art will recognize that various modifications may be made to the described embodiments without departing from the scope of the claims. Accordingly, the present embodiments are to be considered as illustrative and not restrictive, and the invention is not to be limited to the details given herein.

What is claimed is:

1. An aqueous lithium sulfur electrochemical cell comprising:
    an anode structure comprising an electroactive component material;
    a cathode comprising a solid electron transfer medium and solid phase active sulfur;
    an aqueous electrolyte comprising at least 10 vol % of a non-aqueous solvent and greater than 10 vol % of water in direct contact with the electron transfer medium; and
    active sulfur species in direct contact with the aqueous electrolyte;
    wherein the anode electroactive material is isolated from direct contact with the aqueous electrolyte whereby the anode electroactive material does not contact water of the aqueous electrolyte or the active sulfur species.

2. The aqueous lithium sulfur electrochemical cell of claim 1, wherein the solid phase active sulfur is elemental sulfur.

3. The aqueous lithium sulfur electrochemical cell of claim 1, wherein the solid phase active sulfur is lithium sulfide.

4. The aqueous lithium sulfur electrochemical cell of claim 1, wherein the active sulfur concentration in the aqueous electrolyte is greater than 10 molar sulfur.

5. The aqueous lithium sulfur electrochemical cell of claim 1, wherein the active lithium sulfur stoichiometric ratio in the electrolyte is $Li_2S_x$ (x>5).

6. The aqueous lithium sulfur electrochemical cell of claim 1, wherein the electrochemical cell is a secondary battery cell.

7. The aqueous lithium sulfur electrochemical cell of claim 2, wherein the electrochemical cell is a secondary battery cell.

8. The aqueous lithium sulfur electrochemical cell of claim 3, wherein the electrochemical cell is a secondary battery cell.

9. The aqueous lithium sulfur electrochemical cell of claim 4, wherein the electrochemical cell is a secondary battery cell.

10. The aqueous lithium sulfur electrochemical cell of claim 5, wherein the electrochemical cell is a secondary battery cell.

11. An aqueous lithium sulfur electrochemical cell comprising:
    an anode structure comprising a lithium electroactive material;
    a cathode comprising a solid electron transfer medium;
    an aqueous electrolyte comprising at least 10 vol % of a non-aqueous solvent and greater than 10 vol % of water in direct contact with the electron transfer medium; and
    active sulfur species in direct contact with the aqueous electrolyte;
    wherein the anode electroactive material is isolated from direct contact with the aqueous electrolyte whereby the anode electroactive material does not contact water of the aqueous electrolyte or the active sulfur species; and
    wherein the active sulfur concentration in the aqueous electrolyte is greater than 10 molar sulfur and the cell is fabricated devoid of solid phase elemental sulfur.

12. An aqueous lithium sulfur electrochemical cell comprising:
    an anode structure comprising a lithium electroactive material;
    a cathode comprising a solid electron transfer medium;
    an aqueous electrolyte comprising at least 10 vol % of a non-aqueous solvent and greater than 10 vol % of water in direct contact with the electron transfer medium; and
    active sulfur species in direct contact with the aqueous electrolyte;
    wherein the anode electroactive material is isolated from direct contact with the aqueous electrolyte whereby the anode electroactive material does not contact water of the aqueous electrolyte or the active sulfur species; and wherein the electron transfer medium has an overpotential for $H_2$ evolution of at least 50 mV beyond the thermodynamic potential of water reduction.

13. The aqueous lithium sulfur electrochemical cell of claim 12, wherein the electron transfer medium has an overpotential for $H_2$ evolution of at least 100 mV beyond the thermodynamic potential of water reduction.

14. The aqueous lithium sulfur electrochemical cell of claim 12, wherein the electron transfer medium has an overpotential for $H_2$ evolution of at least 200 mV beyond the thermodynamic potential of water reduction.

15. The aqueous lithium sulfur electrochemical cell of claim 12, wherein the electron transfer medium has an overpotential for $H_2$ evolution of at least 300 mV beyond the thermodynamic potential of water reduction.

16. The aqueous lithium sulfur electrochemical cell of claim 12, wherein the electron transfer medium has an overpotential for $H_2$ evolution of at least 500 mV beyond the thermodynamic potential of water reduction.

17. An aqueous lithium sulfur electrochemical cell comprising:

an anode structure comprising a lithium electroactive material;

a cathode comprising a solid electron transfer medium;

an aqueous electrolyte comprising at least 10 vol % of a non-aqueous solvent and greater than 10 vol % of water in direct contact with the electron transfer medium; and active sulfur species in direct contact with the aqueous electrolyte;

wherein the anode electroactive material is isolated from direct contact with the aqueous electrolyte whereby the anode electroactive material does not contact water of the aqueous electrolyte or the active sulfur species; and wherein the cell is discharged to cell voltages below 2.1V.

18. The aqueous lithium sulfur electrochemical cell of claim 17, wherein the cell is discharged to cell voltages below 2.0V.

19. The aqueous lithium sulfur electrochemical cell of claim 17, wherein the cell is discharged to cell voltages below 1.9V.

20. The aqueous lithium sulfur electrochemical cell of claim 17, wherein the cell is discharged to cell voltages below 1.8V.

* * * * *